United States Patent
Hong

(10) Patent No.: US 9,251,439 B2
(45) Date of Patent: *Feb. 2, 2016

(54) IMAGE SHARPNESS CLASSIFICATION SYSTEM

(75) Inventor: Li Hong, San Diego, CA (US)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/118,966

(22) PCT Filed: Aug. 18, 2011

(86) PCT No.: PCT/US2011/048218
§ 371 (c)(1),
(2), (4) Date: Nov. 20, 2013

(87) PCT Pub. No.: WO2013/025220
PCT Pub. Date: Feb. 21, 2013

(65) Prior Publication Data
US 2014/0078320 A1 Mar. 20, 2014

(51) Int. Cl.
*H04N 5/232* (2006.01)
*H04N 5/217* (2011.01)
(Continued)

(52) U.S. Cl.
CPC *G06K 9/66* (2013.01); *G06K 9/036* (2013.01); *G06K 9/40* (2013.01); *G06K 9/46* (2013.01);
(Continued)

(58) Field of Classification Search
CPC ......... G06K 9/66; G06K 9/6267; G06K 9/46; G06K 9/522; G06K 9/40; G06K 9/527; G06K 9/036; H04N 5/23254; H04N 5/23229; H04N 5/217; G06T 7/0002; G06T 2207/30168; G06T 2207/20081
See application file for complete search history.

(56) References Cited

U.S. PATENT DOCUMENTS 5,040,228 A 8/1991 Bose et al.
5,974,159 A 10/1999 Lubin et al.
(Continued)

FOREIGN PATENT DOCUMENTS

WO WO2009/146297 A1 12/2009
WO WO2010/008802 A1 1/2010
WO WO2011/139288 A1 11/2011

OTHER PUBLICATIONS

The International Preliminary Report on Patentability of the International Searching Authority, Feb. 18, 2014, for PCT/US2011/048218 (related application).
(Continued)

*Primary Examiner* — Shahbaz Nazrul
(74) *Attorney, Agent, or Firm* — Roeder & Broder LLP

(57) ABSTRACT

A method for predicting whether a test image (318) is sharp or blurred includes the steps of: training a sharpness classifier (316) to discriminate between sharp and blurred images, the sharpness classifier (316) being trained based on a set of training sharpness features (314) computed from a plurality of training images (306), the set of training sharpness features (314) for each training image (306) being computed by (i) resizing each training image (306) by a first resizing factor; (ii) identifying texture regions (408, 410) in the resized training image; and (iii) computing the set of sharpness features in the training image (412) from the identified texture regions; and applying the trained sharpness classifier (316) to the test image (318) to determine if the test image (318) is sharp or blurred based on a set of test sharpness features (322) computed from the test image (318), the set of test sharpness features (322) for each test image (318) being computed by (i) resizing the test image (318) by a second resizing factor that is different than the first resizing factor; (ii) identifying texture regions (408, 410) in the resized test image; and (iii) computing the set of sharpness features in the test image (412) from the identified texture regions.

15 Claims, 11 Drawing Sheets

(51) Int. Cl.

| | | |
|---|---|---|
| *G06K 9/66* | (2006.01) | |
| *G06K 9/62* | (2006.01) | |
| *G06K 9/46* | (2006.01) | |
| *G06K 9/52* | (2006.01) | |
| *G06K 9/40* | (2006.01) | |
| *G06K 9/03* | (2006.01) | |
| *G06T 7/00* | (2006.01) | |

(52) U.S. Cl.
CPC ............. *G06K 9/522* (2013.01); *G06K 9/527* (2013.01); *G06K 9/6267* (2013.01); *G06T 7/0002* (2013.01); *H04N 5/217* (2013.01); *H04N 5/23229* (2013.01); *H04N 5/23254* (2013.01); *G06T 2207/20081* (2013.01); *G06T 2207/30168* (2013.01)

(56) References Cited

U.S. PATENT DOCUMENTS

| | | | |
|---|---|---|---|
| 6,124,890 | A | 9/2000 | Muramoto et al. |
| 6,298,145 | B1 | 10/2001 | Zhang et al. |
| 6,548,800 | B2 | 4/2003 | Chen et al. |
| 6,888,564 | B2 | 5/2005 | Caviedes |
| 6,987,530 | B2 | 1/2006 | McConica |
| 7,079,704 | B2 | 7/2006 | Caviedes |
| 7,119,854 | B2 | 10/2006 | Dantwala |
| 7,171,042 | B2 * | 1/2007 | Hartmann et al. ............ 382/159 |
| 7,181,082 | B2 | 2/2007 | Feng |
| 7,257,273 | B2 | 8/2007 | Li et al. |
| 7,356,195 | B2 | 4/2008 | Shaked et al. |
| 7,437,012 | B2 * | 10/2008 | Carasso ........................ 382/255 |
| 7,519,231 | B2 | 4/2009 | Li et al. |
| 7,545,985 | B2 | 6/2009 | Zhang et al. |
| 7,586,520 | B2 | 9/2009 | Igarashi |
| 7,653,256 | B2 | 1/2010 | Kanda et al. |
| 7,668,388 | B2 | 2/2010 | Bryll |
| 8,472,744 | B2 | 6/2013 | Hong |
| 8,538,140 | B2 | 9/2013 | Farid et al. |
| 8,594,385 | B2 * | 11/2013 | Marchesotti et al. ......... 382/112 |
| 2002/0145106 | A1 | 10/2002 | Chen et al. |
| 2003/0011717 | A1 | 1/2003 | McConica |
| 2003/0138163 | A1 | 7/2003 | Chen et al. |
| 2003/0219172 | A1 | 11/2003 | Caviedes et al. |
| 2004/0001633 | A1 | 1/2004 | Caviedes |
| 2004/0056174 | A1 | 3/2004 | Specht et al. |
| 2004/0066981 | A1 | 4/2004 | Li et al. |
| 2004/0081370 | A1 | 4/2004 | Murphy |
| 2004/0120598 | A1 | 6/2004 | Feng |
| 2005/0123214 | A1 | 6/2005 | Takahira |
| 2005/0175235 | A1 | 8/2005 | Luo et al. |
| 2005/0244075 | A1 | 11/2005 | Shaked et al. |
| 2005/0244077 | A1 | 11/2005 | Kitamura et al. |
| 2006/0039593 | A1 | 2/2006 | Sammak et al. |
| 2006/0056731 | A1 | 3/2006 | Bouk et al. |
| 2006/0078217 | A1 | 4/2006 | Poon et al. |
| 2006/0078218 | A1 | 4/2006 | Igarashi |
| 2006/0126093 | A1 * | 6/2006 | Fedorovskaya et al. ..... 358/1.14 |
| 2006/0147107 | A1 * | 7/2006 | Zhang et al. .................. 382/159 |
| 2006/0147125 | A1 | 7/2006 | Caviedes |
| 2006/0153471 | A1 | 7/2006 | Lim et al. |
| 2006/0188170 | A1 | 8/2006 | Kanda et al. |
| 2006/0204120 | A1 | 9/2006 | Poon et al. |
| 2006/0204121 | A1 | 9/2006 | Bryll |
| 2006/0269141 | A1 | 11/2006 | Takahashi et al. |
| 2007/0071346 | A1 | 3/2007 | Li et al. |
| 2007/0098254 | A1 | 5/2007 | Yang et al. |
| 2007/0177805 | A1 | 8/2007 | Gallagher et al. |
| 2007/0263897 | A1 | 11/2007 | Ong et al. |
| 2007/0290886 | A1 | 12/2007 | Stam et al. |
| 2008/0013861 | A1 | 1/2008 | Li et al. |
| 2008/0025627 | A1 | 1/2008 | Freeman et al. |
| 2008/0226148 | A1 | 9/2008 | Gu et al. |
| 2009/0016616 | A1 | 1/2009 | Kasahara |
| 2009/0079862 | A1 | 3/2009 | Subbotin |
| 2009/0116713 | A1 | 5/2009 | Yan et al. |
| 2010/0061642 | A1 | 3/2010 | Kondo et al. |
| 2010/0272356 | A1 | 10/2010 | Hong |
| 2011/0019909 | A1 | 1/2011 | Farid et al. |
| 2011/0043656 | A1 * | 2/2011 | Tanaka ........................ 348/222.1 |
| 2013/0033608 | A1 | 2/2013 | Hong |

OTHER PUBLICATIONS

Yu et al., Smart Album—Photo Filtering by Effect Detections, SIGGRAPH 2008, Aug. 11 to Aug. 15, 2008, ISBN 978-1-60558-466-9/08/20008, Los Angeles, CA.

Liu et al., Image Partial Blur Detection and Classification, Dept. of Computer Science and Engineering, The Chinese University of Hong Hong, {rtliu,zrli, leojia}©cse.cuhk.edu.hk.The work described in this paper was fully supported by a grant from Research Grants Council of Hong Kong Special Administrative Region, China (Project No. 412307).

Gonsalves, Robert A., Phase retrieval and diversity in adaptive optics, Optical Engineering Sep./Oct. 1982, vol. 21 No. 5, © 1982 Society of Photo-Optical Instrumentation Engineers.

Zhang, et al., "An Investigation of Perceived Sharpness and Sharpness Metrics," 2005,Proc. SPIE vol. 5668, Dept. of Psychological Sciences, Purdue University.

Crete et al. "The Blur Effect: Perception and Estimation with a New No-Reference Perceptual Blur Metric", 2007, Proc. SPIE vol. 6492, author manuscript, hal-00232709, version 1—Feb. 1, 2008, published in SPIE Electronic Imaging Symposium Conf Human Vision and Electronic Imaging, San Jose (2007).

Safonov et al., "Adaptive Sharpening of Photos," (Proceedings Paper) 2008, Proc. SPIE vol. 6807 (2008) Samsung Research Center, Moscow Russia 125047; Samsung Digital Printing Division, Suwon, Korea 443-742.

Shaked et al., "Sharpness Measure: Towards Automatic Image Enhancement," 2007, SPIE vol. 6492 presented IEEE International Conference on Image Processing, © Copyright 2005 Hewlett-Packard Development Company, L.P.

Lim et al., "Detection of Out-Of-Focus Digital Photographs", Jan. 20, 2005, HPL-2005-14, HP Labs Technical Report, © Copyright Hewlett-Packard Company 2005.

Hsu et al., Blurred Image Detection and Classification, MMM 2008, pp. 277-286, LNCS 4903, ©2008 Springer-Verlag Berlin Heidelberg.

The International Search Report and Written Opinion for PCT/US2009/048165, Aug. 14, 2009, Nikon Corporation.

The International Preliminary Report on Patentability for PCT/US2009/048165, Mar. 27, 2012, Nikon Corporation.

The International Search Report and Written Opinion for PCT/US2010/039843, Aug. 19, 2010, Nikon Corporation.

The International Preliminary Report on Patentability for PCT/US2010/039843, Nov. 15, 2012, Nikon Corporation.

The International Search Report and Written Opinion for PCT/US2011/048218, Apr. 23, 2012, Nikon Corporation (related to the present application).

The International Preliminary Report on Patentability for PCT/US2009/045128, Dec. 27, 2010, Nikon Corporation.

The International Search Report and Written Opinion for PCT/US2009/045128, Oct. 26, 2009, Nikon Corporation.

* cited by examiner

550 ⤸         D₁ ↘

$$\begin{array}{ccccc} A_H & B_H & C_H & D_H & E_H \\ F_H & G_H & H_H & I_H & J_H \\ K_H & L_H & M_H & N_H & O_H \\ P_H & Q_H & R_H & S_H & T_H \\ U_H & V_H & W_H & X_H & Y_H \end{array}$$

$$\begin{array}{ccccc} A_B & B_B & C_B & D_B & E_B \\ F_B & G_B & H_B & I_B & J_B \\ K_B & L_B & M_B & N_B & O_B \\ P_B & Q_B & R_B & S_B & T_B \\ U_B & V_B & W_B & X_B & Y_B \end{array}$$

$$\begin{array}{ccccc} 0 & 1 & 1 & 0 & 0 \\ 0 & 0 & 1 & 1 & 1 \\ 0 & 1 & 1 & 0 & 0 \\ 0 & 0 & 0 & 0 & 0 \\ 0 & 0 & 0 & 0 & 1 \end{array}$$

$$\begin{array}{ccccc} 0 & 0 & 1 & 0 & 0 \\ 1 & 1 & 0 & 0 & 0 \\ 0 & 0 & 1 & 1 & 0 \\ 1 & 1 & 1 & 1 & 0 \\ 0 & 0 & 0 & 0 & 0 \end{array}$$

Fig. 5D

IMAGE SHARPNESS CLASSIFICATION SYSTEM

RELATED APPLICATIONS

As far as is permitted, the contents of PCT Application Serial No. PCT/US2010/039843 filed on Jun. 24, 2010 and entitled "IMAGE SHARPNESS CLASSIFICATION SYSTEM" are incorporated herein by reference.

BACKGROUND

Cameras are commonly used to capture an image of a scene that includes one or more objects. Unfortunately, sometimes the images can be blurred. For example, movement of the camera and/or movement of the objects in the scene during the exposure time of the camera can cause the image to be blurred. Further, if the camera is not properly focused when the image is captured, that image will be blurred.

As digital photography becomes more and more popular, image quality assessment such as sharpness measurement has been a topic of great interest. Sharpness is generally described as the measurement of either the clarity of details or the transition of edges inside an image. Currently, there are certain methods based on measuring certain information inside the image that are used to evaluate the sharpness of an image. Unfortunately, existing methods do not accurately and consistently evaluate the level of sharpness over a broad variety of images. Additionally, it has been an especially challenging task to attain robust performance for specific image types, such as noisy images, macros, close-up portraits, night scenes, images with high contrast blurry edges and images with rich textures, etc.

SUMMARY

The present invention is directed to a method for predicting whether a test image is sharp or blurred. In one embodiment, the method includes the steps of: (A) training a sharpness classifier to discriminate between sharp and blurred images, the sharpness classifier being trained based on a set of training sharpness features computed from a plurality of training images, the set of training sharpness features for each training image being computed by (i) resizing each training image by a first resizing factor; (ii) identifying texture regions in the resized training image; and (iii) computing the set of sharpness features in the training image from the identified texture regions; and (B) applying the trained sharpness classifier to the test image to determine if the test image is sharp or blurred based on a set of test sharpness features computed from the test image, the set of test sharpness features for each test image being computed by (i) resizing the test image by a second resizing factor; (ii) identifying texture regions in the resized test image; and (iii) computing the set of sharpness features in the test image from the identified texture regions. In one embodiment, the second resizing factor can be substantially equal to the first resizing factor so that the same sharpness standard is applied for both training images and test images. Alternatively, in certain embodiments, the second resizing factor can be greater than the first sizing factor so the sharpness standard for training images is higher than the sharpness standard for test images so small blur images can be identified more easily. Still alternatively, in some embodiments, the second resizing factor can be less than the first resizing factor so the sharpness standard for training images is weaker than the sharpness standard for test images so sharp images can be identified very easily.

Additionally, in one embodiment, the first resizing factor is smaller than the second resizing factor.

In one embodiment, the step of training includes the steps of generating a high pass training image from the resized training image, and identifying texture regions in the high pass training image. In such embodiment, the step of applying includes the steps of generating a high pass test image from the resized test image, and identifying texture regions in the high pass test image. Additionally, the step of identifying the texture regions in the high pass training image and/or identifying the texture regions in the high pass test image can include the steps of: constraining texture regions in the high pass image to be pixels with values in the high pass image that exceed a preset texture threshold; and constraining texture regions in the high pass image to be pixels with corresponding gradient values exceed a preset gradient threshold.

Further, in one embodiment, the step of training includes the steps of generating a band pass training image from the resized training image, and identifying texture regions in the band pass training image. In such embodiment, the step of applying includes the steps of generating a band pass test image from the resized test image, and identifying texture regions in the band pass test image. Additionally, the step of identifying the texture regions in the band pass training image and/or identifying the texture regions in the band pass test image can include the steps of: constraining texture regions in the band pass image to be pixels with values in the band pass image that exceed a preset texture threshold; and constraining texture regions in the band pass image to be pixels with corresponding gradient values exceed a preset gradient threshold.

In one embodiment, the steps of generating a high pass training image, generating a band pass training image, generating a high pass test image, and generating a band pass test image include utilizing one or more omni-directional type filters. Alternatively, in one embodiment, the steps of generating a high pass training image, generating a band pass training image, generating a high pass test image, and generating a band pass test image include utilizing one or more oriented filters.

In some embodiments, the method as described herein further comprises the step of determining if there is motion blur in the test image. In one such embodiment, if it is determined that there is motion blur in the test image, the step of generating the high pass test image and the step of generating the band pass test image includes the use of one or more oriented filters. Alternatively, in one such embodiment, if it is determined that there is not motion blur in the test image, the step of generating the high pass test image and the step of generating the band pass test image includes the use of one or more omni-directional filters.

In certain embodiments, motion blur can be determined by (i) calculating a hand-holdable factor for the test image; (ii) comparing the hand-holdable factor to a hand-holdable factor threshold; and (iii) if the hand-holdable factor exceeds the hand-holdable factor threshold, then testing the test image for motion blur. In conducting such prescreening to determine if the hand-holdable factor for the test image exceeds the hand-holdable factor threshold before conducting any actual motion blur testing, certain computational costs can be avoided, while still inhibiting test images from being misclassified as sharp.

Additionally, in one embodiment, the step of computing the set of sharpness features in the training image and/or computing the set of sharpness features in the test image includes computing one or more of the following sharpness features:

(i) a measure of the texture percentage in the band pass image;

(ii) a measure of the mean energy in the textured regions of the high pass image;

(iii) a measure of the mean energy in the textured regions of the band pass image;

(iv) a measure of the ratio of mean energy difference between textures in the band pass image to the mean energy of textures in the high pass image; and (v) a measure of the mean ratio of per texture pixel energy in the band pass image to the combined energy of the band pass image and the high pass image.

In some embodiments, the method as described herein further comprises the steps of: identifying metadata associated with the test image; and using the metadata associated with the test image to aid in determining if the test image is sharp or blurred. In such embodiments, the metadata can include one or more of the following: ISO value associated with the test image; an exposure value associated with the test image; magnification factor associated with the test image; and a depth of field factor associated with the test image.

Additionally, in one embodiment, the method can further comprise the steps of categorizing the test image as a macro type image or a non-macro type image based on the magnification factor; and resizing the test image by a different resizing factor depending on whether the test image is categorized as a macro type image or a non-macro type image. Further, in one embodiment, the method can further comprise the steps of categorizing the test image as a macro-level one type image, a macro-level two type image or a non-macro type image based on the magnification factor; and resizing the test image by a different resizing factor depending on whether the test image is categorized as a macro-level one type image, a macro-level two type image or a non-macro type image.

In one embodiment, the method as described herein can further comprise the steps of: identifying a test image with high noise level based on the ISO value; determining if the exposure value of the test image is low; applying strong noise reduction to pixels in the texture regions of the test image if the test image has high noise level and the exposure value is low; and applying relaxed noise reduction to pixels in the texture regions of the test image if the test image has high noise level and the exposure value is not low.

Additionally, in one embodiment, the method as described herein can further comprise the steps of: determining if the exposure value of a test image is not low; evaluating the test image to determine if the test image contains weak texture regions; and excluding pixels in the weak texture regions from the step of computing the set of sharpness features in the test image from the identified texture regions if the test image has the exposure value that is not low.

Further, in one embodiment, the method as described herein can further comprise the steps of: identifying a high contrast edge in the test image; approximating the gradient direction of the high contrast edge; determining if the high contrast edge is blurry; and excluding pixels in the texture regions of the test image if they define blurry high contrast edges.

Still further, in one embodiment, the step of identifying texture regions in the resized test image includes the steps of constraining texture regions in the resized test image to be pixels with values in the resized test image that exceed a preset texture threshold and constraining texture regions in the resized test image to be pixels with corresponding gradient values exceed a preset gradient threshold. In such embodiment, the method as described herein can further comprise the steps of: determining if the test image includes rich texture; categorizing the test image as a macro type image or a non-macro type image based on the magnification factor; and increasing one or more of the preset texture threshold and the preset gradient threshold for identifying texture regions in the resized test image if the test image includes rich texture and is a macro-type image.

Moreover, the present invention is directed to a camera that performs the procedures described herein. Alternatively, the present invention can be utilized in a personal computer for post-processing of one or more images, or on an on-line site for post-processing of one or more images.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 5A is a simplified illustration of a portion of a high pass filtered image having features of the present invention;

FIG. 5B is a simplified illustration of a portion of a band pass filtered image having features of the present invention;

FIG. 5C is a simplified illustration of the textured regions of the portion of the high pass filtered image of FIG. 5A;

FIG. 5D is a simplified illustration of the textured regions of the portion of the band pass filtered image of FIG. 5B;

DESCRIPTION

Figure 1:
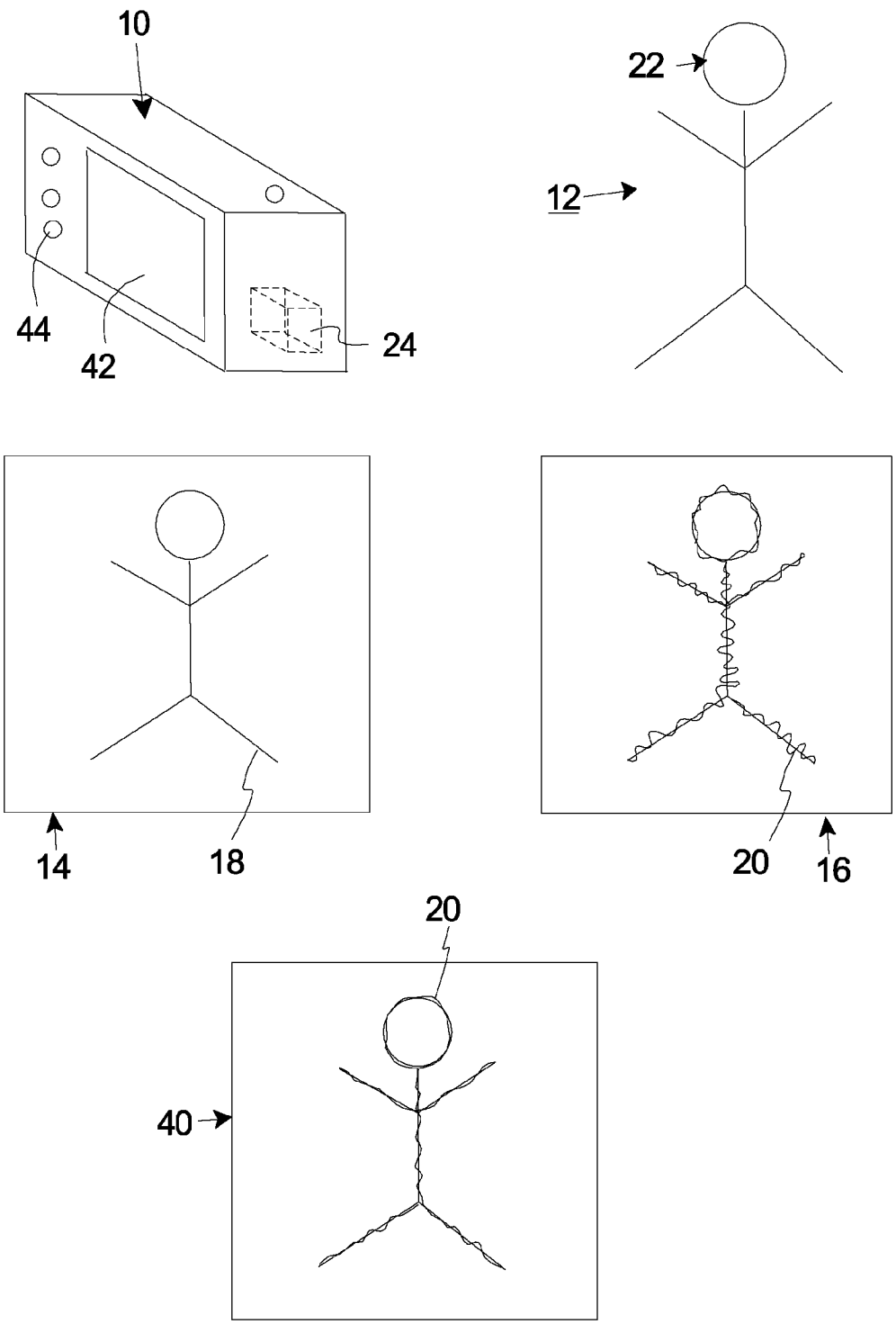
FIG. 1 is a simplified view of a scene, an image apparatus having features of the present invention, a raw, first captured image of the scene, a raw, second captured image of the scene, a raw, third captured image of the scene, and an adjusted image of the scene.

FIG. 1 is a simplified perspective view of an image apparatus 10 having features of the present invention, and a scene 12. FIG. 1 also illustrates a raw first captured image 14 (illustrated away from the image apparatus 10) of the scene 12, and a raw second captured image 16 (illustrated away from the image apparatus 10) of the scene 12, each captured by the image apparatus 10. In certain embodiments, one or more of the captured images 14, 16 can be a sharp image 18, and/or one or more of the captured images 14, 16 can include blur 20. For example, in FIG. 1, the first captured image 14 is intended to illustrate a sharp image 18 (including non-wavy lines), and the second captured image 16 is intended to illustrate an image containing blur 20 (including wavy lines). Movement of the image apparatus 10, and/or movement of an object 22 in the scene 12 during the capturing of the blurred image 16 can cause motion blur 20 in the image 16. Additionally, or alternatively, out-of-focus blur 20 in the blurred image 16 can be caused by the image apparatus 10 not being properly focused when the image 16 is captured.

In one embodiment, as provided herein, the image apparatus 10 includes a control system 24 (illustrated in phantom) that uses a unique method for estimating if one or more of the captured images 14, 16 is sharp or includes blur with improved accuracy. Subsequently, a deblurring process can be applied to only the images 16 that are determined to be blurred. Thus, a sharp image 14 will not be unnecessarily subjected to the deblurring process. Alternatively, in one embodiment, the control system 24 can estimate if one or more of the captured images 14, 16 is sharp, includes small blur, or includes large blur.

As an overview, in certain embodiments, the control system 24 uses a learning-based image sharpness classification algorithm that automatically detects whether the captured image 14, 16 is sharp, or includes blur. In one embodiment, the algorithm utilizes a sharpness classifier that is trained based on a set of novel sharpness features that relate to image sharpness. For any new captured image 14, 16, somewhat similar sharpness features are calculated and passed as input to the trained sharpness classifier to predict whether the captured image 14, 16 is sharp, or includes blur. In certain embodiments, the sharpness classifier focuses on the task of image sharpness classification instead of a precise sharpness measurement, thereby providing an automatic tool for users to quickly identify sharp images 14 or blurred images 16 from large image collections. Robustness is one of the main advantages of a learning-based sharpness classification over other single feature sharpness measurement systems. Moreover, the present algorithm detects out-of-focus blur as well as motion blur in the images 14, 16.

As provided herein, the sharpness features are designed to capture information from texture regions in high-pass and band pass images derived from the original image 14, 16. The choices of sharpness features are crucial in a learning-based classification algorithm, because the sharpness features directly influence the classification performance. Additionally, in certain embodiments, several unique adjustments in computation of the sharpness features are used to accommodate the different sharpness characteristics of some challenging image types, such as noisy images, night scene/indoor scene images, macro/close-up images, rich texture images, high contrast blurry images, etc.

Further, with the algorithm provided herein, the control system 24 is able to quickly and accurately detect blurry images.

The type of scene 12 captured by the image apparatus 10 can vary. For example, the scene 12 can include one or more objects 22, e.g. animals, plants, mammals, and/or environments. For simplicity, in FIG. 1, the scene 12 is illustrated as including one object 22. Alternatively, the scene 12 can include more than one object 22. In FIG. 1, the object 22 is a simplified stick figure of a person, although it is recognized that the object 22 in FIG. 1 can be any object 22 and is representative of any suitable image. For instance, the scenes 12 can include macros, close-up portraits, rich texture images, and/or night scene or other low light images, as non-exclusive examples.

Figure 2:
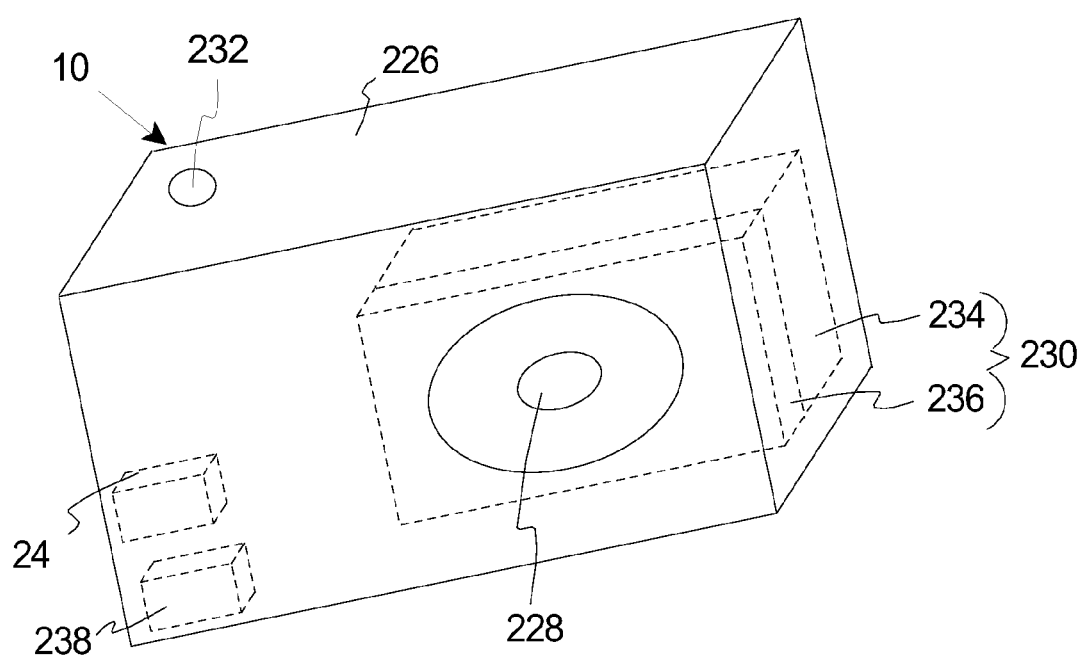
FIG. 2 is a simplified front perspective view of the image apparatus in FIG. 1.

FIG. 2 illustrates a simplified, front perspective view of one non-exclusive embodiment of the image apparatus 10. In this embodiment, the image apparatus 10 is a digital camera, and includes an apparatus frame 226, an optical assembly 228, and a capturing system 230 (illustrated as a box in phantom), in addition to the control system 24 (illustrated as a box in phantom). The design of these components can be varied to suit the design requirements and type of image apparatus 10. Further, the image apparatus 10 could be designed without one or more of these components. Additionally or alternatively, the image apparatus 10 can be designed to capture a video of the scene 12 (illustrated in FIG. 1).

The apparatus frame 226 can be rigid and support at least some of the other components of the image apparatus 10. In one embodiment, the apparatus frame 226 includes a generally rectangular shaped hollow body that forms a cavity that receives and retains at least some of the other components of the camera. Further, the apparatus frame 226 can include a shutter button 232 that causes the capturing system 230 to capture the image.

The optical assembly 228 can include a single lens or a combination of lenses that work in conjunction with each other to focus light onto the capturing system 230. In one embodiment, the image apparatus 10 includes an autofocus assembly (not shown) including one or more lens movers that move one or more lenses of the optical assembly 228 in or out until the sharpest possible image of the subject is received by the capturing system 230.

The capturing system 230 captures information for the images 14, 16 (illustrated in FIG. 1). The design of the capturing system 230 can vary according to the type of image apparatus 10. For a digital-type camera, the capturing system 230 includes an image sensor 234 (illustrated in phantom) e.g. a charge coupled device, a filter assembly 236 (illustrated in phantom) e.g. a Bayer filter, and a storage system 238 (illustrated in phantom). The storage system 238 can be fixedly or removably coupled to the apparatus frame 226. Non-exclusive examples of suitable storage systems 238 include flash memory, a floppy disk, a hard disk, or a writeable CD or DVD.

The control system 24 is electrically connected to and controls the operation of the electrical components of the image apparatus 10. The control system 24 can include one or more processors and circuits, and the control system 24 can be programmed to perform one or more of the functions described herein. In FIG. 2, the control system 24 is secured to the apparatus frame 226 and the rest of the components of the image apparatus 10. Further, in this embodiment, the control system 24 is positioned within the apparatus frame 226 for in camera processing of the images. Alternatively, the control system that utilizes the algorithm disclosed herein can be separate from the camera, e.g., the control system can be a computer or a website that performs post-processing on the images 14, 16.

Referring back to FIG. 1, the control system 24 includes software and/or firmware that utilizes one or more methods to determine if a given image 14, 16 is sharp, or includes blur. In various embodiments, the control system 24 includes firmware that has previously been programmed or "trained" during the manufacturing process that predicts whether a new image 14, 16 (also sometimes referred to herein as a "test image") subsequently taken by the image apparatus 10 is sharp, or includes blur. Alternatively, as noted above, the control system 24 can include software and/or firmware that cooperate to predict whether a new image 14, 16 subsequently taken by the image apparatus 10 is sharp, includes small blur, or includes large blur.

Further, in certain embodiments, the control system 24 can include software that reduces the amount of blur 20 in the blurred image 16 to provide an adjusted image 40. In this example, the control system 24 can determine that the first captured image 14 is sharp and that no further processing is necessary. Further, the control system 24 can determine that the second captured image 16 includes blur. Subsequently, the control system 24 reduces the blur in the second captured image 16 to provide the adjusted image 40.

In some embodiments, the image apparatus 10 can further include an image display 42 that displays the raw images 14, 16 and/or the adjusted image 40. With this design, the user can decide which images 14, 16, 40 should be stored and which images 14, 16, 40 should be deleted. Further, the image display 42 can display other information that can be used to control the functions of the image apparatus 10.

Moreover, the image apparatus 10 can include one or more control switches 44 electrically connected to the control system 24 that allows the user to control the functions of the image apparatus 10. For example, one or more of the control switches 44 can be used to selectively switch the image apparatus 10 to the blur evaluation and reduction processes disclosed herein. For example, in certain embodiments, in order to save computation, the present invention can be selectively applied (manually or automatically) to only certain types of images, e.g. close up portraits, macros, noisy images, night scene or other low light images, rich texture images, etc.

Figure 3:
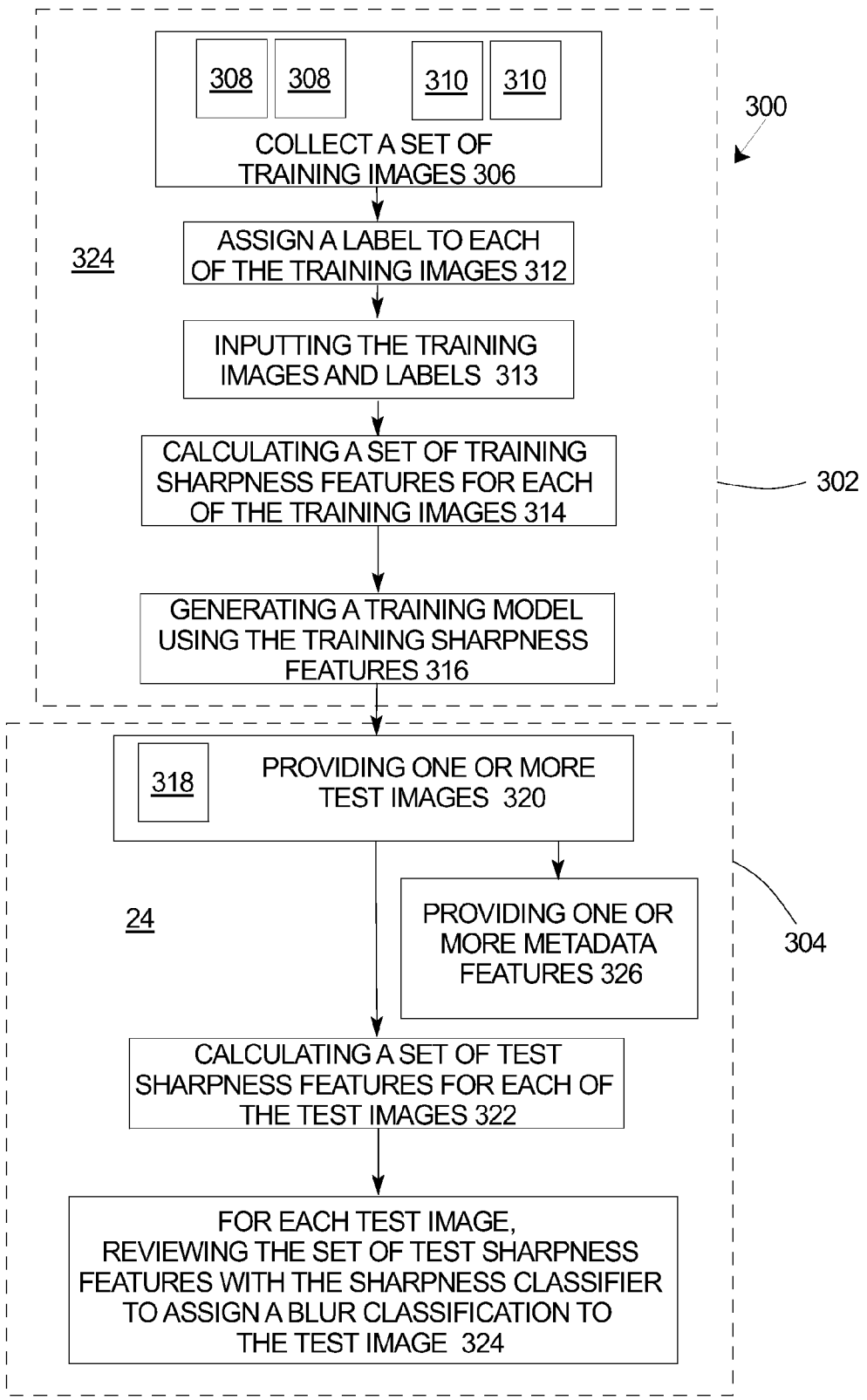
FIG. 3 is a flow chart that illustrates one embodiment of an image classification system having features of the present invention.

FIG. 3 is a flow chart that illustrates one embodiment of an image classification system 300 having features of the present invention. In this embodiment, the image classification system 300 can include a training phase 302 (illustrated as dashed box) and a predicting phase 304 (illustrated as dashed box). With the present invention, the image classification system 300 utilizes a robust learning-based classification framework.

The training phase 302 can include one or more of the following steps:
 (i) at step 306, collecting a set of training images (also sometimes referred to herein as a "training image set") composed of sharp training images 308 and blurry training images 310 (only two are illustrated as boxes);
 (ii) at step 312, assigning a sharp label or a blur label to the training images (also sometimes referred to herein as the "classification step");
 (iii) at step 313, inputting the set of training images and their respective labels into the control system;
 (iv) at step 314, calculating a set of training sharpness features for each of the training images; and
 (v) at step 316, generating a training model (also sometimes referred to herein as a "sharpness classifier" or simply as a "classifier") using the training sharpness features from the training images.

It should be noted that, in alternative embodiments, one or more of the steps of the training phase 302 can be performed by the control system 24 (illustrated in FIG. 1), and/or one or more of the steps of the training phase 302 can be performed by a separate control system 324 (e.g. a computer) and subsequently the training model 316 can be input into the control system 24 of the camera 10 for in camera blur classification. For example, some of the steps of the training phase 302 can be performed by a control system 324 that is remote from the camera.

The number of training images 308, 310 in the set of training images 306 can be varied. However, in general, the greater the number of training images 308, 310 used during the training phase 302, the greater the accuracy during the predicting phase 304. For example, hundreds or even thousands or more of sharp training images 308 and blurred training images 310 can be used during the training phase 302. In certain embodiments, the real-life sharp training images 308 and blurred training images 310 are selected to cover wide varieties of image types, camera settings, etc. Further, in certain embodiments, one or more of the blurred training images 310 can be generated from sharp images that were artificially blurred.

At step 312, the training images 308, 310 are subjectively and/or objectively classified or labeled based on the opinion(s) of one or more persons with skills or expertise at determining sharp versus blurred images. Ideally, this classification step 312 should include a substantially consistent classification protocol of all training images 308, 310 reviewed during the classification step 312.

As provided above, at step 313, the set of training images 306 and the corresponding labels for each of the training images 308, 310 are input into the control system.

At step 314, the set of training sharpness features 314 for each of the training images 308, 310 is calculated and/or collected. In one embodiment, for each of the training images 308, 310, the training sharpness features 314 are calculated using information from certain textured regions in a high pass image and a band pass image for each of the respective training images 308, 310. The process used and examples of suitable training sharpness features 314 are described in more detail below.

After the sets of training sharpness features are collected, the calculated sets of training sharpness features are input into the classification algorithm to generate the sharpness classifier at step 316. Stated in another fashion, the sharpness classifier is trained based on the sets of training sharpness features, aiming to best capture the difference between the sharp training images 308 and the blurred training images 310. In one non-exclusive embodiment, a linear classification algorithm such as linear discriminant analysis (LDA) is used due to its simplicity and efficiency. Alternatively, for example, another type of classical learning algorithm, such as support vector machines (SVM) can be utilized.

The predicting phase 304 can include one or more of the following steps:
 (i) at step 320, providing one or more new images 318 (sometimes referred to as a "test image" and only one is illustrated with a box) to the control system (whether these new images 318 are sharp or blurred is unknown);
 (ii) at step 322, calculating a set of test sharpness features for each of the test images; and
 (iii) at step 324, for each test image, reviewing the set of test sharpness features with the trained sharpness classifier to predict whether the test image is either sharp, or blurred (sometimes referred to as "assigning a blur classification").

It should be noted that, in alternative embodiments, one or more of the steps of the predicting phase 304 can be performed by the control system 24, and/or one or more of the steps of the predicting phase 304 can be performed by the separate control system 324 and subsequently input into the control system 24 of the camera 10 for in camera blur classification. For example, some of the steps of the predicting phase 304 can be performed by a control system that is remote from the camera.

At step 320, the one or more test images 318 are provided to the control system 24. In one embodiment, this step is done by capturing the one or more test images 318 with the capturing system 230 described above and illustrated in FIG. 2. Alternatively, one or more previously captured test images 318 can be provided to the control system 24.

In one embodiment, at step 326, one or more metadata features for each test image 318 can also be provided to the control system 24 during the predicting process 304. The one or more metadata features 326 can be collected during the capturing of the test image 318. For example, the one or more metadata features 326 can include focal length, f-number, exposure time, ISO sensitivity, whether or not a flash was used to take the original image, an exposure value (EV) and/or a hand-holdable factor (X). Each of these metadata features 326 is a standard feature for a typical image apparatus 10 such as a digital camera. In an alternative embodiment, the metadata features 326 are not collected and are not utilized during the predicting process 304.

At step 322, the set of test sharpness features 322 for each test image 318 is calculated and/or collected. In one embodiment, for each test image 318, the set of test sharpness features 322 are calculated in a substantially similar manner as the training sharpness features for each training image. More specifically, for each test image 318, the test sharpness features 322 are calculated using information from certain textured regions in a high pass image and a band pass image for each respective test image 318. The process used and examples of suitable test sharpness features 322 are described in more detail below.

At step 324, for each test image 318, the set of test sharpness features 322 is analyzed or reviewed with the trained sharpness classifier to predict whether the test image is either sharp or blurred.

Figure 4:
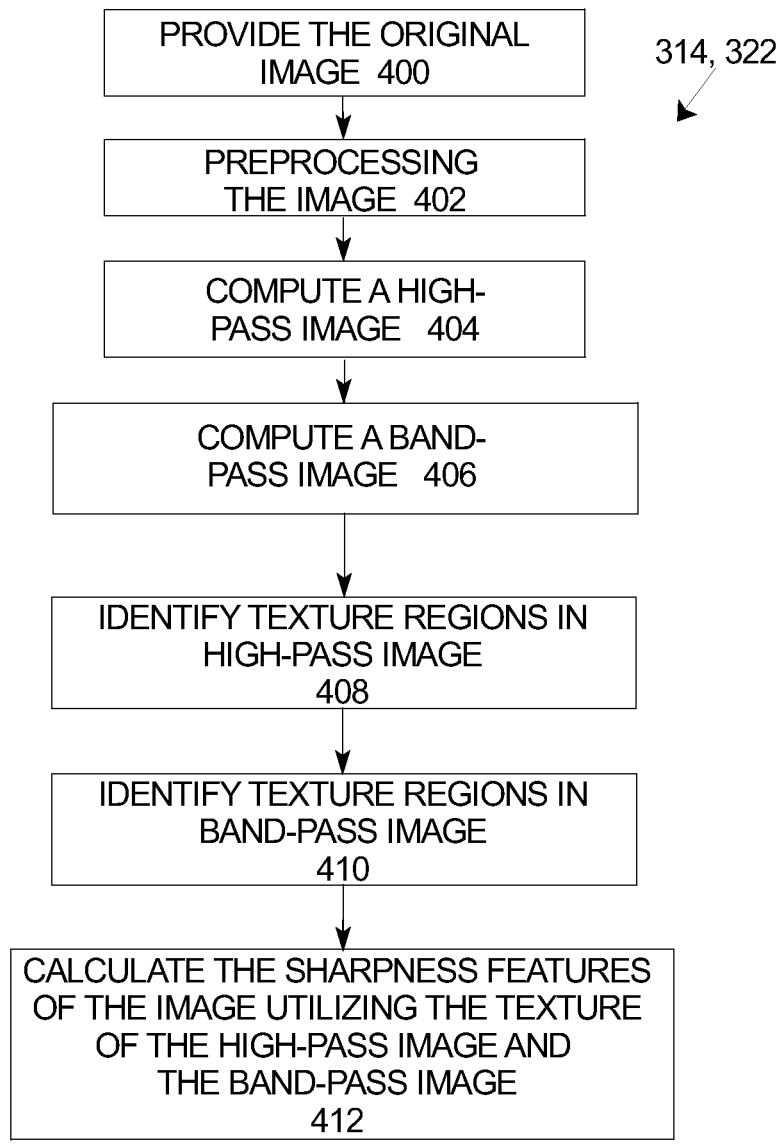
FIG. 4 is a flow chart that illustrates one embodiment of the steps used for calculating a set of sharpness features.

FIG. 4 is a flow chart that illustrates one embodiment of the steps used for calculating the set of training sharpness features for each training image (step 314 in FIG. 3) and/or for calculating the set of test sharpness features for each test image (step 322 in FIG. 3). As mentioned above, the process used to calculate the set of training sharpness features 314 for each of the training images 308, 310 is substantially similar to the process used to calculate the set of test sharpness features 322 for each the test image 318. Thus, the processes will be described concurrently.

The method for calculating each set of sharpness features 314, 322 can include one or more of the following steps:
(i) at step 400, an original image "OG" is provided to the control system;
(ii) at step 402, the original image "OG" is preprocessed to create a preprocessed/reduced image "RG" (for simplification purposes, either or both the original image "OG" and the preprocessed/reduced image "RG" can be referred to generically as the image "G");
(iii) at step 404, a high pass image "$D_1$" is computed from the image "G";
(iv) at step 406, a band pass image "$D_2$" is computed from the image "G";
(v) at step 408, the texture regions in the high pass image "$D_1$" are identified;
(vi) at step 410, the texture regions in the band pass image "$D_2$" are identified; and
(vii) at step 412, the set of sharpness features for the image "G" are calculated utilizing certain textured regions of the high pass image "$D_1$", and certain textured regions of the band pass image "$D_2$".

It should be noted that one or more of the steps 400-412 can be omitted and/or the order of one or more of the steps can be changed without deviating from the spirit of the present invention.

As provided above, at step 400, the original image "OG" is provided to the control system. The original image "OG" can be one of the training images 308, 310 or one of the test images 318 because the sharpness features for each are calculated in a substantially similar fashion. Additionally, the original image "OG" can be a color image or a gray-scale image.

Subsequently, at step 402, the size of the original image "OG" is preprocessed and/or reduced to reduce the computational cost for the algorithm and to increase the speed in which the set of sharpness features of the image "G" can be calculated. This is particularly important for the embodiments in which the control system 24 of the camera 10 performs the predicting process 304. To save cost and size, the performance of a control system for a camera is generally limited. Thus, in order to quickly calculate the set of test sharpness features with the camera for in camera blur prediction, it is generally desirable to reduce the size of the original test image. Further, because the training images and the test images are processed similarly, the size of the training images can be reduced in a somewhat similar fashion.

In one embodiment, during the preprocessing of the image "OG", (i) the original image "OG", if it is a color image, can be converted to a gray-scale image (this step is skipped if the original image "OG" is a gray-scale image); (ii) the border of the image "OG" can be cropped (e.g., in alternative, non-exclusive examples, the remaining center of the image after border cropping can be approximately forty, fifty, or sixty percent of the image) because the user is typically primarily concerned with the center of the image; and/or (iii) the image "OG" can be resized (e.g., sub-sampled by a resizing factor of one-third "⅓", one-fourth "¼" or by some other resizing factor). In certain alternative embodiments, the order of steps (i)-(iii) can be varied, and/or the reduction process can exclude one or more of the steps (i), (ii), or (iii). In one embodiment, if the steps are performed in the order (i), (ii), (iii), the color image "OG" is converted to a gray-scale image "GG", the border of the gray-scale image "GG" is cropped to create a cropped gray-scale image "COG", and the cropped gray-scale image "COG" is sub-sampled to provide the reduced size image "RG".

As stated above, in some embodiments, the images "G" can be sub-sampled by a resizing factor of approximately one-third. Alternatively, the images "G" can be sub-sampled by a resizing factor of less than or greater than one-third. In particular, for certain types of images, it may be desired to get a slightly sharper version of the image. For such images, the images "G" can be sub-sampled by a resizing factor of less than one-third, e.g., one-fourth, to get a slightly sharper version than that from using the resizing factor of one-third. For example, as is discussed in more detail below, for different levels of macro/close-up type images, a slightly smaller resizing factor can be used.

Additionally and/or alternatively, in certain embodiments, the training image can be resized by a different resizing factor than the test image. More particularly, in one such embodiment, a slightly smaller resizing factor can be applied for training images and a slightly larger resizing factor can be applied for test images. For example, in one embodiment, if the training image is resized by a resizing factor of one-fourth, then the test image can be resized by a resizing factor of one-third. Alternatively, in another embodiment, if the training image is resized by a resizing factor of one-third, then the test image can be resized by a resizing factor of one-half. Still alternatively, in still another embodiment, if the training image is resized by a resizing factor of one-fifth, then the test image can be resized by a resizing factor of one-fourth.

Intuitively, a resized image that has been slightly down sampled appears sharper than its original resolution. Accordingly, by utilizing the smaller resizing factor for training images, there will be a corresponding higher sharpness standard for the trained classifier. Additionally, utilizing the larger resizing factor for test images will lead to potentially great improvements in small blur detection rates as these testing small blur images will appear more blurry when judged by the trained classifier. Further, employing varying resizing factors can also reduce average processing time.

Further, each image "G" can be auto-scaled to [0 255], by increasing or decreasing the contrast as needed, for example.

Next, at step 404, the high pass filtered image "$D_1$" is computed from the image "G". In one embodiment, a low-pass filtered image "$B_1$" is created from the image "G" using a low-pass filter "H" (e.g. a Gaussian filter or binomial filter). This is expressed in equation 1 below:

$$B_1 = H*G, \quad \text{Equation 1}$$

In certain embodiments, the low-pass filter "H" is omni-directional. Alternatively, as described below, the low-pass filter "H" can be oriented.

Subsequently, the high pass image "$D_1$" can be computed as the absolute difference between the image "G" and its low-pass filtered image "$B_1$". This is expressed in Equation 2 below:

$$D_1 = |G - B_1| \quad \text{Equation 2}$$

Alternatively, the high pass image "$D_1$" can be directly computed by applying a high pass filter "X" to the image "G". This is expressed in equation 3 below:

$$D_1 = X*G, \quad \text{Equation 3}$$

In certain embodiments, the high pass filter "X" is omni-directional. Alternatively, as described below, the high pass filter "X" can be oriented.

FIG. 5A is a simplified illustration of a portion of a high pass image "$D_1$". It should be noted that the high pass image "$D_1$" is comprised of a plurality of pixels 550 (only a few representative pixels are illustrated in FIG. 5A) and each pixel 550 has its own value. In this example, the high pass image "$D_1$" is illustrated as a five by five pixel array for simplicity. However, a typical high pass image "$D_1$" will be comprised of thousands or millions of pixels 550 (depending on the amount of reduction in step 402 and the design and settings of the camera that captured the image).

Next, at step 406, the band pass filtered image "$D_2$" is computed from the image "G". In one embodiment, the band pass image "$D_2$" is computed as the absolute difference between two levels of low-pass filtered images. For example, a second level low-pass filtered image "$B_2$" can be created by re-applying the low-pass filter "H" (e.g. a Gaussian filter or binomial filter) to the first level low-pass filtered image "$B_1$". This is expressed in equation 4 below:

$$B_2 = H*B_1, \quad \text{Equation 4}$$

Alternatively, a first level filter can be applied to the image "G" to create the first level low-pass filtered image "$B_1$", and a separate, second level filter can be applied to the image "G" to create the second level low-pass filtered image "$B_2$".

In certain embodiments, the filter(s) is/are omni-directional. Alternatively, as described below, the filter(s) can be oriented.

Subsequently, the band pass image "$D_2$" can be computed as the absolute difference between the first level low-pass filtered image "$B_1$", and the second level low-pass filtered image "$B_2$". This is expressed in Equation 5 below:

$$D_2 = |B_1 - B_2| \quad \text{Equation 5}$$

FIG. 5B is a simplified illustration of a portion of a band pass filtered image "$D_2$". It should be noted that the band pass filtered image "$D_2$" is comprised of a plurality of pixels 552 (only a few representative pixels are illustrated in FIG. 5B) and each pixel 552 has its own value. In this example, the band pass filtered image "$D_2$" is illustrated as a five by five pixel array for simplicity. However, a typical band pass filtered image "$D_2$" will be comprised of thousands or millions of pixels 552 (depending on the amount of reduction in step 402 and the design and settings of the camera that captured the image). It should be noted that the band pass filtered image "$D_2$" should be the same size as the high pass image "$D_1$" because they are generated from the same image "G".

Next, at step 408, the textured regions in the high pass image "$D_1$" are identified. As provided herein, the pixels 550 of the high pass image "$D_1$" can be characterized based on the texture of the areas that they capture. For example, the high pass image "$D_1$" can include (i) one or more smooth pixels, (e.g. pixels that have captured areas which have a substantially constant color (color homogenous regions)); and/or (ii) one or more texture pixels (e.g. pixels that have captured regions, e.g. areas which are in the transition between objects, lines, and color changes). It is difficult to detect blur from smooth pixels because these regions are homogenous. Additionally, as described in detail below, some specific cases of texture pixels can lead to misclassification of the image as sharp and/or including blur, and thus, such texture pixels are not utilized for classifying the sharpness or blur of the image. Accordingly, as provided herein, the present invention identifies and utilizes certain of the textured regions to classify blur.

The method used to initially identify the textured regions can vary. In one non-exclusive embodiment, the step of identifying the textured pixels in the high pass image "$D_1$" includes, for each pixel 550, the steps of: (i) comparing the value to a certain predetermined H threshold value, and (ii) comparing the corresponding gradient value to a certain predetermined H gradient threshold. In this embodiment, for each pixel 550, (i) the pixel 550 is a textured pixel if its value is greater than or equal to the certain H threshold value and its gradient value is greater than or equal to the certain H gradient threshold, or (ii) the pixel 550 is a smooth pixel if its value is less than the certain H threshold value or its gradient value is less than the certain H gradient threshold. The values of the certain predetermined H threshold value, and the certain predetermined H gradient threshold can be varied to change the characteristics of the system.

In Equation 6 below, $T_1$ represents identified texture regions in the high-pass filter image "$D_1$":

$$T_1 = D_1 >= \text{texture}TH_1 \ \& \ \text{gradient}G >= \text{gradient}TH \quad \text{Equation 6}$$

Where gradientG is the gradient value of image G, textureTH$_1$ represents the certain predetermined H threshold value, and gradientTH represents the certain predetermined H gradient threshold.

FIG. 5C is a simplified illustration the textured regions $T_1$ of the portion of the high pass filtered image "$D_1$" of FIG. 5A. In this embodiment, a binary image is used with the textured regions $T_1$ of the high pass filtered image "$D_1$" represented as "1's" and the smooth regions represented as "0's". In this example, (i) pixel $A_H$ was classified as a smooth pixel because either its value was less than the certain H threshold intensity value or its gradient value was less than the certain H gradient threshold, and (ii) pixel $B_H$ was classified as a textured pixel because both its value was greater than or equal to the certain H threshold intensity value and its gradient value was greater than or equal to the certain H gradient threshold.

Alternatively, the textured pixels in the high pass image "$D_1$" can be identified in a different fashion.

As will be described in greater detail below, during the step of identifying the textured pixels in the high pass image "$D_1$", certain pixels and/or regions that would otherwise be identified as textured pixels or textured regions may be excluded from consideration for purposes of classifying the sharpness and/or blur of the test image.

At step 410, the texture regions in the band pass image "$D_2$" are identified. As provided herein, the pixels 552 of the band pass image "$D_2$" can be characterized based on the texture of the areas that they capture. For example, the band pass image "$D_2$" can include (i) one or more smooth pixels, (e.g. pixels that have captured areas which have a substantially constant color (color homogenous regions)); and/or (ii) one or more texture pixels (e.g. pixels that have captured regions, e.g. areas which are in the transition between objects, lines, and color changes).

In one non-exclusive embodiment, the step of identifying the textured pixels in the band pass image "$D_2$" includes, for each pixel 552, the steps of: (i) comparing the value to a certain predetermined B threshold value, and (ii) comparing a gradient value to a certain predetermined B gradient threshold. In this embodiment, for each pixel 552, (i) the pixel 552 is a textured pixel if its value is greater than or equal to the certain B threshold intensity value and its gradient value is greater than or equal to the certain B gradient threshold, or (ii) the pixel 552 is a smooth pixel if its intensity value is less than the certain B threshold intensity value or its gradient value is less than the certain B gradient threshold. The values of the certain predetermined B threshold value, and the certain predetermined B gradient threshold can be the same for different than the values used for the high pass image "$D_1$".

In Equation 7 below, $T_2$ represents identified texture regions in the band pass image "$D_2$":

$$T_2 = D_2 >= \text{texture}TH_2 \text{ \& gradient}G >= \text{gradient}TH \qquad \text{Equation 7}$$

Where gradientG is the gradient value of image G, textureTH$_2$ represents the certain predetermined B threshold value, and gradientTH represents the certain predetermined B gradient threshold.

FIG. 5D is a simplified illustration the textured regions of the portion of the band pass filtered image "$D_2$" of FIG. 5B. In this embodiment, a binary image is used with the textured regions $T_2$ of the band pass filtered image "$D_2$" represented as "1's" and the smooth regions represented as "0's". In this example, (i) pixel $A_B$ was classified as a smooth pixel because either its value was less than the certain B threshold value or its gradient value was less than the certain B threshold threshold, and (ii) pixel $C_B$ was classified as a textured pixel because both its intensity value was greater than or equal to the certain B threshold intensity value and its gradient value was greater than or equal to the certain B gradient threshold.

Alternatively, the textured pixels in the band pass image "$D_2$" can be identified in a different fashion.

As will be described in greater detail below, during the step of identifying the textured pixels in the band pass image "$D_2$", certain pixels and/or regions that would otherwise be identified as textured pixels or textured regions may be excluded from consideration for purposes of classifying the sharpness and/or blur of the test image.

Finally, at step 412, the set of sharpness features for the image "G" are calculated utilizing certain textured regions $T_1$ of the high pass image "$D_1$", and certain textured regions $T_2$ of the band pass image "$D_2$". Stated in another fashion, after identifying the texture regions $T_1$, $T_2$, and then potentially eliminating certain textured regions $T_1$, $T_2$ from consideration based on certain factors, e.g., certain metadata information associated with the corresponding image "G", as described below, the present invention calculates the set of sharpness features from the remaining identified texture regions $T_1$, $T_2$. The number of separate sharpness features in the set of sharpness features can be varied to achieve the desired accuracy and speed of the system. In one embodiment, the present invention utilizes six separate sharpness features, namely a first sharpness feature $F_1$, a second sharpness feature $F_2$, a third sharpness feature $F_3$, a fourth sharpness feature $F_4$, a fifth sharpness feature $F_5$, and a sixth sharpness feature $F_6$. It should be noted that the terms first, second, third, fourth, fifth and sixth are used merely for convenience and that any of the sharpness features can be referred to as the first, second, third, fourth, fifth or sixth sharpness feature. In this example, the six sharpness features can be calculated from the remaining identified texture regions $T_1$, $T_2$ with the aim to capture the sharpness characteristics. Further, the methods used to calculate each of the sharpness features can be varied.

In one embodiment, the six sharpness features for each image are as follows:

(i) the first sharpness feature $F_1$ represents the percentage of the texture regions $T_2$ related to the whole band pass image "$D_2$"; the first sharpness feature $F_1$ is expressed in Equation 8 below:

$$F_1 = \text{\# of texture pixels } T_2/\text{total \# of pixels in } T_2 \qquad \text{Equation 8}$$

In the example of the texture regions $T_2$ of the band pass image "$D_2$" illustrated in FIG. 5D (assuming no textured pixels are otherwise removed from consideration), there are ten textured pixels and twenty-five total pixels. Thus, in this example $F_1 = 0.4$ (10/25).

Alternatively, for example, the first sharpness feature $F_1$ can represent the percentage of the texture regions $T_1$ related to the whole high-pass filtered image "$D_1$".

(ii) the second sharpness feature $F_2$ represents the mean energy of texture regions "$T_1$" in the high pass image "$D_1$"; the second sharpness feature $F_2$ is expressed in Equation 9 below:

$$F_2 = \text{mean}(D_1(T_1 == 1)) \qquad \text{Equation 9}$$

Basically, in this embodiment, referring to FIGS. 5A and 5C, pixels $B_H$, $C_H$, $H_H$, $I_H$, $J_H$, $L_H$, $M_H$, and $Y_H$ were identified as texture pixels. In this embodiment, the values of these texture pixels (from the high pass image "$D_1$") are added together and divided by the total number of texture pixels (e.g. eight in this example) to determine the mean energy of texture regions "$T_1$" in the high pass image "$D_1$". Thus, the texture regions "$T_1$" in the high pass image "$D_1$" is used as a mask to calculate the mean energy from only the textured pixels of the high pass image "$D_1$".

(iii) the third sharpness feature $F_3$ represents the mean energy of texture regions "$T_2$" in the band pass image "$D_2$"; the third sharpness feature $F_3$ is expressed in Equation 10 below:

$$F_3 = \text{mean}(D_2(T_2 == 1)) \qquad \text{Equation 10}$$

Basically, in this embodiment, referring to FIGS. 5B and 5D, pixels $C_B$, $F_B$, $G_B$, $M_B$, $N_B$, $P_B$, $Q_B$, $R_B$, $S_B$, and $W_B$ were identified as texture pixels. In this embodiment, the values of these texture pixels (from the band pass image "$D_2$") are added together and divided by the total number of texture pixels (e.g. ten in this example) to determine the mean energy of texture regions "$T_2$" in the band pass image "$D_2$". Thus, the texture regions "$T_2$" in the band pass image "$D_2$" is used as a mask to calculate the mean energy from only the textured pixels of the band pass image "$D_2$".

(iv) the fourth sharpness feature $F_4$ represents the ratio of the mean energy difference between the texture regions "$T_1$" in the high pass image "$D_1$" and the texture regions "$T_2$" in band-pass image filtered image "$D_2$", to the mean energy of the texture regions "$T_1$" in the high pass image "$D_1$"; the fourth sharpness feature $F_4$ is expressed in Equation 11 below:

$$F_4 = (F_2 - F_3)/F_2 \qquad \text{Equation 11}$$

Alternatively, for example, Equation 11 could be changed to divide by $F_3$, to provide ratio information regarding the images $D_1$, $D_2$.

(v) the fifth sharpness feature $F_5$ represents the mean ratio of per texture pixel energy in band pass image "$D_2$" to the combined energy of band pass image "$D_2$" and high pass image "$D_1$"; the fifth sharpness feature $F_5$ is expressed in Equation 12 below:

$$F_5 = \text{mean}(D_2(T_1==1)./(D_1(T_1==1)+D_2(T_1==1))) \qquad \text{Equation 12}$$

Basically, in this embodiment, referring to FIGS. 5A and 5C, pixels $B_H$, $C_H$, $H_H$, $I_H$, $J_H$, $L_H$, $M_H$, and $Y_H$ were identified as texture pixels "$T_1$". In this embodiment, (i) the value from the band pass image "$D_2$" (illustrated in FIG. 5B) for each textured pixel "$T_1$" is divided by (ii) combined energy for that pixel from the high pass image "$D_1$" and the band pass filtered image "$D_2$". After this is done for all of the texture pixels "$T_1$", the mean value is subsequently calculated to determine $F_5$. In the equations provided herein, the symbol "1" is used to represent that division is processed in each pixel of the image.

For example, because pixel $B_H$ was identified as having texture, the value for this pixel is calculated by taking the value at $B_B$ and dividing it by the sum of the value at $B_H$ plus $B_B$. This process is repeated for pixels $C_H$, $H_H$, $I_H$, $J_H$, $L_H$, $M_H$, and $Y_H$. The values are then added and subsequently divided by the total number of texture pixels "$T_1$".

Thus, the texture regions "$T_1$" in the high pass image "$D_1$" is used as a mask to calculate the fifth sharpness feature $F_5$ using the band pass image "$D_2$" and the high pass image "$D_1$".

(vi) the sixth sharpness feature $F_6$ represents the mean ratio of per texture pixel energy in band pass image "$D_1$" to the combined energy of band pass image "$D_2$" and high pass image "$D_1$"; the sixth sharpness feature $F_6$ is expressed in Equation 13 below:

$$F_6 = \text{mean}(D_2(T_2==1)./(D_1(T_2==1)+D_2(T_2==1))) \qquad \text{Equation 13.}$$

Basically, in this embodiment, referring to FIGS. 5B and 5D, pixels $C_B$, $F_B$, $G_B$, $M_B$, $N_B$, $P_B$, $Q_B$, $R_B$, $S_B$, and $W_B$ were identified as texture pixels "$T_2$". In this embodiment, (i) the value from the band pass image "$D_2$" (illustrated in FIG. 5B) for each textured pixel "$T_2$" is divided by (ii) combined energy for that pixel from the high pass image "$D_1$" and the low-pass filtered image "$D_2$". After this is done for all of the texture pixels "$T_2$", the mean value is subsequently calculated to determine $F_5$.

For example, because pixel $C_B$ was identified as having texture, the value for this pixel is calculated by taking the value at $C_B$ and dividing it by the sum of the value at $C_H$ plus $C_B$. This process is repeated for pixels $F_B$, $G_B$, $M_B$, $N_B$, $P_B$, $Q_B$, $R_B$, $S_B$, and $W_B$. The values are then added and subsequently divided by the total number of texture pixels "$T_2$".

Thus, the texture regions "$T_2$" in the band pass image "$D_2$" is used as a mask to calculate the sixth sharpness feature $F_6$ using the band pass image "$D_2$" and the high pass image "$D_1$".

It should be noted that the system can be designed so that the set of sharpness features includes less than six or greater than six separate sharpness features calculated from the textured regions $T_1$ of the high pass image "$D_1$", and the textured regions $T_2$ of the band pass image "$D_2$".

The method provided above works well in detecting most types of blurred images. However, as provided herein, in certain embodiments, several adjustments can be made in the computation of the sharpness features to accommodate for different types of test images.

Motion Blur (e.g. Caused by Camera Shake)

In the event of possible motion blur, the portions of the captured objects in the image (training or test) that are parallel with the motion direction will appear as sharp, even though the image suffers motion blur. In certain situations, the methods described above may lead to an incorrect classification that the test image is sharp. Thus, in some embodiments, (i) it can be desirable to test for motion blur of the training image prior to generating the training model, and/or (ii) it can be desirable to test for motion blur of the test image prior to image classification. For example, in certain embodiments, the present invention first estimates if the image has possible motion blur and in the event possible motion blur is detected, the image is handled slightly differently. More specifically, if the probability of motion blur exceeds a certain threshold, the respective image is considered to have motion blur and the respective sharpness features are computed from oriented high-pass and oriented band pass images, and the orientation of the filter is the same as the estimated motion blur direction of the respective image.

In one, non-exclusive embodiment, the test for motion blur can be referred to as principle component analysis or PCA-based motion estimation, although alternative motion estimation testing can also be utilized. Unfortunately, such testing can be rather expensive and time consuming. Accordingly, in certain embodiments, the present invention further includes a method for restricting the use of such testing or estimation of motion blur to only situations when the image has a hand-holdable factor that is higher than a certain hand-holdable factor threshold. The benefits of this include reduced computational costs, while still avoiding misclassification of certain sharp images with textures in a single dominant direction.

The hand-holdable factor can be defined as the focal length times the exposure time (Xhand=focal length×exposure time). Experience has demonstrated that using a fast exposure time makes the presence of motion blur much less likely. Stated another way, for any given focal length, the faster the exposure time, the less likely that the captured image will suffer from motion blur.

The hand-holdable factor threshold can be varied. In certain situations, it has been found that if the hand-holdable factor is less than one, then the image is likely safe from including motion blur. However, in one embodiment, in order to set a very conservative measure of when PCA-based motion estimation should be applied to determine the presence of motion blur in the image, a hand-holdable threshold of 0.1 can be applied. Stated another way, if the calculated hand-holdable factor is less than the hand-holdable threshold, i.e. the calculated hand-holdable factor is less than 0.1, then the image will be determined as unlikely including motion blur and the PCA-based motion estimation will be avoided. Alternatively, a hand-holdable factor threshold of greater than 0.1 or less than 0.1 can be applied to determine when the PCA-based motion estimation will be utilized and when the PCA-based motion estimation will be avoided. For example, in one embodiment, because experience has shown that motion blur is unlikely if the hand-holdable factor is less than one, then a hand-holdable factor threshold of one can be applied to determine the potential use of the PCA-based motion estimation. Moreover, in certain alternative embodiments, a hand-holdable factor threshold of 0.15, 0.2, 0.3, 0.5, 0.7, 0.85, or some other suitable hand-holdable factor threshold can be applied to determine the potential use of the PCA-based motion estimation.

Figure 6A:
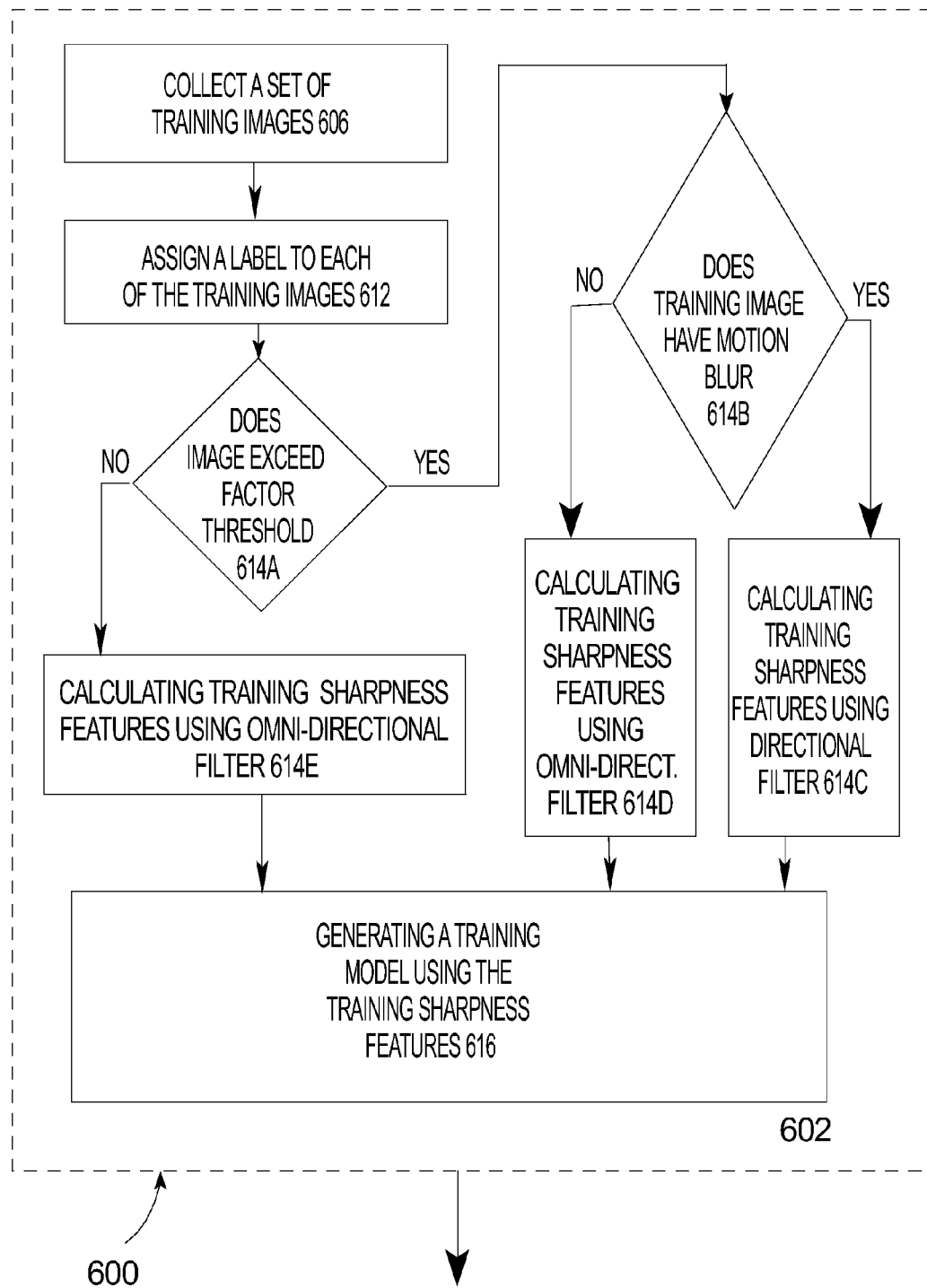
FIGS. 6A and 6B are flow charts that illustrate another embodiment of an image classification system having features of the present invention.
Figure 6B:
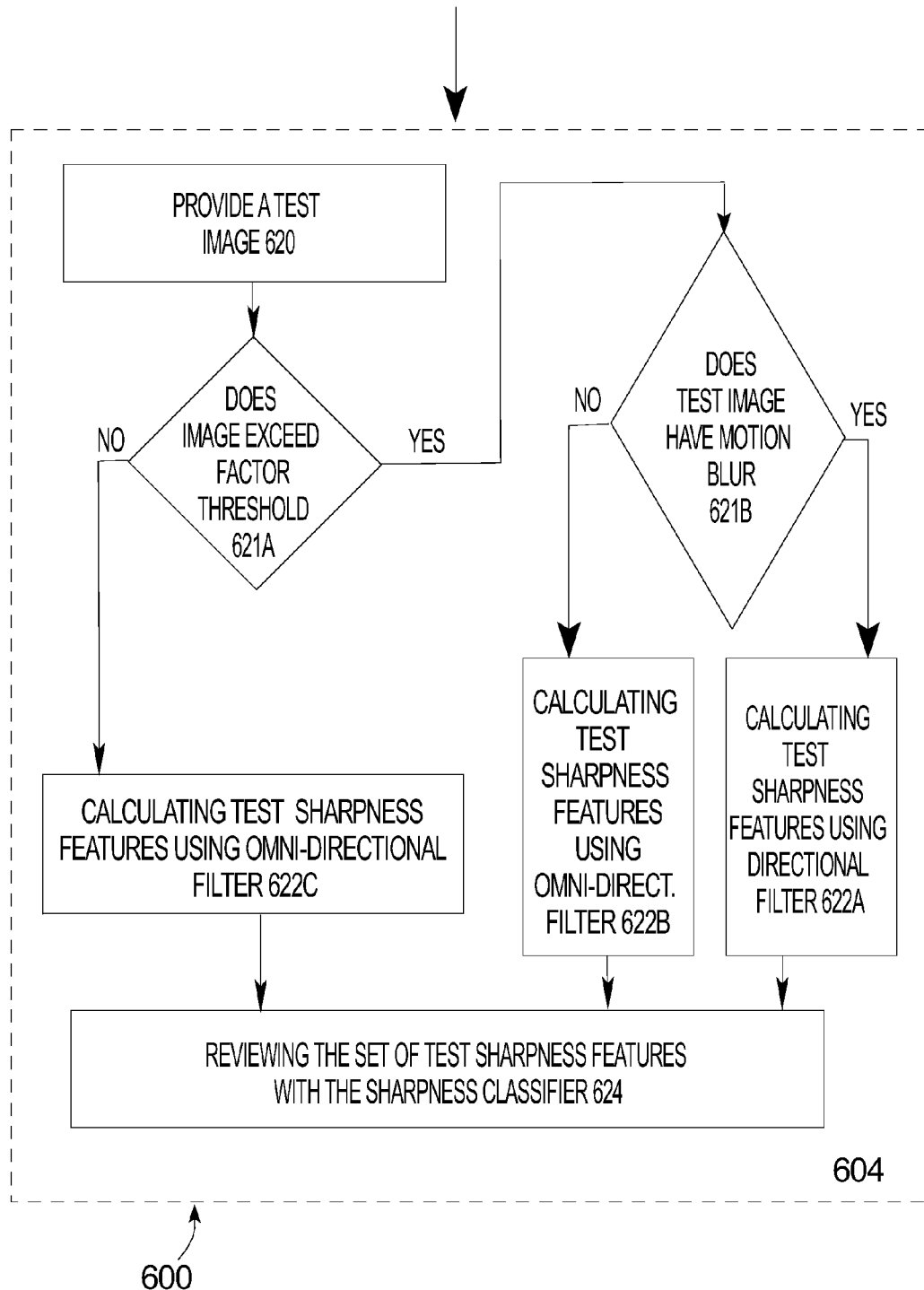

By way of example, FIGS. 6A and 6B are flow charts that illustrate another embodiment of an image classification system 600 having features of the present invention. In this embodiment, the image classification system 600 includes a training phase 602 (illustrated as dashed box in FIG. 6A) and a predicting phase 604 (illustrated as dashed box in FIG. 6B) that are somewhat similar to the embodiment illustrated in FIG. 3. However, in this embodiment, the hand-holdable factor of each of the images, i.e. each of the training images and each of the test images, is evaluated to determine if the hand-holdable factor for the image exceeds a specified hand-holdable factor threshold. If the hand-holdable factor for the image does not exceed the hand-holdable factor threshold, then the image is not tested for motion blur and the calculation of the set of training sharpness features and/or the calculation of the test sharpness features proceeds as described above. However, if the hand-holdable factor for the image does exceed the hand-holdable factor threshold, then the image is further tested for motion blur. Subsequently, if the image is found to contain motion blur, then the calculation of the set of training sharpness features and/or the calculation of the test sharpness features is adjusted accordingly.

More specifically, in FIG. 6A, during the training phase 602, (i) at step 606, the set of training images is collected (similar to step 306 described above); (ii) at step 612, the training images are labeled (similar to step 312 described above); (iii) at step 614A, the hand-holdable factor of the training image is compared to a hand-holdable factor threshold; (iv) if yes, at step 614B, the training image is tested or estimated for motion blur; (v) at one of steps 614C-614E, a set of training sharpness features from the training images are calculated; and (vi) at step 616, a training model is generated for the sets of training sharpness features (similar to step 316 described above).

In particular, at step 614A, the hand-holdable factor of the training image is calculated and then compared to the hand-holdable factor threshold to determine if motion blur testing/estimation is warranted.

If the hand-holdable factor of the training image is found to exceed the hand-holdable factor threshold, then at step 614B, the training image is tested and/or estimated as to whether motion blur is present within the training image. In the event the possibility of motion blur of the training image exceeds a certain threshold, the training image is considered to have motion blur and, at step 614C, the respective training sharpness features are computed from oriented high-pass and oriented band pass images, with the orientation of the filter being the same as the estimated motion blur direction of the respective image. Conversely, in the event the possibility of motion blur of the training image does not exceed a certain threshold, the training image is not considered to have motion blur, and at step 614D, the training image is processed with an omni-directional filter similar to step 314 described above. The method used for estimating if the training image has motion blur (step 614B) is substantially the same as the method (step 621B) used for estimating if the test image has motion blur described in detail below. Further, the method used for calculating the training sharpness features (step 614C) for a training image estimated to have motion blur is substantially the same as the method (step 622B) used for calculating the test sharpness features for a test image estimated to have motion blur described in detail below.

If the hand-holdable factor of the training image is found to not exceed the hand-holdable factor threshold, then at step 614E, the training image is processed with an omni-directional filter similar to step 314 described above.

As illustrated in FIG. 6B, the predicting process 604 includes: (i) at step 620, providing the test image; (ii) at one or more of steps 621A and 621B, determining if motion blur estimation is warranted, if yes, then estimating if there is motion blur in the test image, and if so, estimating the motion blur direction; (iii) at one of steps 622A-622C, calculating a set of test sharpness features from the test image; and (iv) at step 624, comparing the set of test sharpness features to the training model to estimate if the test image is sharp or blurred.

In particular, in step 621A, the hand-holdable factor of the test image is calculated and then compared to a hand-holdable factor threshold to determine if motion blur testing/estimation is warranted.

If the hand-holdable factor of the test image is found to exceed the hand-holdable factor threshold, then at step 621B, the test image is tested and/or estimated as to whether motion blur is present within the test image. Subsequently, if it is determined that there is motion blur along a first direction, at step 622A, the set of test sharpness features is calculated using a directional filter that is oriented in the first direction. Conversely, if it is determined that there is no motion blur, at step 622B, the set of test sharpness features is calculated using an omni-directional filter similar to step 322 described above.

If the hand-holdable factor of the test image is found to not exceed the hand-holdable factor threshold, then at step 622C, the set of test sharpness features is calculated with an omni-directional filter similar to step 322 described above.

The method used at step 621B for estimating if there is motion blur in the test image and estimating the motion blur direction can vary. Typically, in an image with motion blur, the edges of the objects along the motion direction remain sharp. Thus, an image with large motion blur will likely have a dominant gradient direction related to the motion blur direction. In one embodiment, the method provided herein checks to determine whether there exists a dominant gradient direction. In certain embodiments, when evaluating gradient directions, long edge structures in the image should be identified and excluded from the computation of dominant gradient orientation. These long edges/structures are likely not caused by motion blur. In one embodiment, the gradient directions are computed from a resized test image to reduce computational complexity. Long edge structures will still remain as edge structures in a resized much smaller image; while short edge structures most likely will disappear in a much smaller image.

In one, non-exclusive embodiment, as provided above, the dominant gradient direction can be estimated using PCA-based motion estimation. In this embodiment, a data set is formed from all the detected edge pixels, with each data set containing two components: a x-direction gradient, and a y-direction gradient. Next, PCA is applied to these data sets to extract the $1^{st}$ component direction and its variance, and the $2^{nd}$ component direction and its variance. As provided herein, the ratio of the $1^{st}$ component variance to the $2^{nd}$ component variance can be compared to some threshold to determine if there exists dominant gradient direction. If yes, the $1^{st}$ component direction is the corresponding gradient direction.

The steps used for calculating the subsets of training sharpness features for each training image, and the set of test sharpness features for each test image are somewhat similar to the steps described above. As provided herein, the first subset of the sets of training sharpness features and the set of test sharpness features can be calculated using the omni-directional low pass filter "H" to obtain the high pass image "$D_1$" and band pass image "$D_2$". With this design, the associated first and sixth sharpness features $F_1$ to $F_6$ capture very well the sharpness characteristics of an image "G" that is independent of sharp structure orientations.

However, for motion blurred images, these features may capture sharp structures with orientations following the motion blur direction. Therefore, in certain embodiments, for test images suffering motion blur, an oriented filter "OH" (e.g. oriented with the direction of motion blur) that is low pass in the direction of the motion blur can be used to compute an oriented high-pass filter image "$OD_1$" and an oriented band pass image "$OD_2$" and compute similar sharpness features accordingly. With this design, the sharpness features $OF_1$, $OF_2$, $OF_3$, $OF_4$, $OF_5$, $OF_6$, extracted from texture regions $OT_1$, $OT_2$ associated with the oriented high pass image "$OD_1$" and band pass image "$OD_2$" measure the sharpness degree only along motion blur direction, thus avoiding capturing sharp structures following motion blur direction. In this embodiment, the oriented filter is used to calculate the second subset of the sets of training sharpness features and the test sharpness features.

As provided herein, the oriented high pass image $OD_1$ and the oriented band pass image $OD_2$ are calculated in a similar manner as the computation of the $D_1$ and $D_2$ described above in reference to FIG. 4. The differences here are replacing the omni-directions low pass filter H with an oriented low pass filter aligned with the estimated motion blur direction.

Similarly, the texture regions in the oriented high-pass $OT_1$ and the oriented band pass images $OT_2$ can be identified in a similar fashion as the texture regions were identified in the omni-directional images described above. This can be expressed as follows:

$$OT_1 = OD_1 >= \text{texture}TH_1 \& \text{gradient}G >= \text{gradient}TH$$

$$OT_2 = OD_2 >= \text{texture}TH_2 \& \text{gradient}G >= \text{gradient}TH$$

Further, the oriented sharpness features can be calculated from texture regions of the oriented high-pass and band pass images, similar to sharpness features extracted from omni-oriented high-pass and band pass images:

(1). The first oriented sharpness feature $OF_1$ measures the percentage of texture regions from oriented band pass image related to the whole image.

(2). The second oriented sharpness feature $OF_2$ measures the mean energy of textures in the oriented high-pass image.

(3). The third oriented sharpness feature OF3 measures the mean energy of textures in the oriented band-pass image.

(4). The fourth oriented sharpness feature $F_4$ measures the ratio of mean energy difference between textures in the oriented high-pass and band pass images to the mean energy of textures in the oriented high pass image. ($OF_4 = (OF_2 - OF_3)/OF_2$)

(5). The fifth oriented sharpness feature $OF_5$ and the sixth oriented sharpness feature $OF_6$ measure the mean ratio of per texture pixel energy in the oriented band-pass filtered to the combined energy of the oriented band-pass and high pass images.

In summary, if there is no motion blur in the test image, the omni-directional six sharpness features $F_1$, $F_2$, . . . , $F_6$ are collected. Alternatively, if there is detected motion blur in the test image, the six oriented features $OF_1$, $OF_2$, . . . , $OF_6$ are collected to reflect the sharpness characteristics along detected motion blur direction.

Additionally, in certain embodiments, several other unique adjustments in preprocessing of the images and/or in computation of the sharpness features are used to accommodate the different sharpness characteristics of some challenging image types, such as macro/close-up images, noisy images, night scene/indoor scene images, images with high contrast blurry structures, rich texture images, etc. In one embodiment, the special image types can be quickly and simply identified based on metadata information, and preprocessing of the image and/or the sharpness feature computation can be adjusted accordingly. In the situation where metadata information is not available, the images are preprocessed and the test sharpness features are calculated without any specific adjustments.

Alternatively, one or more image analysis-based methods can be used to identify the special image types. Still alternatively, the image analysis methods can be combined with the metadata information to further enhance the detection accuracy of special image types.

Macro/Close-Up Type Images

In one, non-exclusive embodiment, the macro/close up images can be identified mainly based on magnification factor. In order to calculate magnification factor, metadata information such as object distance and focal length are required (e.g. Magnification factor=focal length/(object distance−focal length)). As described herein, the categorization of an image as a macro/close up image or as a non-macro image can be utilized for adjusting the preprocessing of the image and/or can be utilized to adjust the computation of one or more of the image sharpness features.

Figure 7:
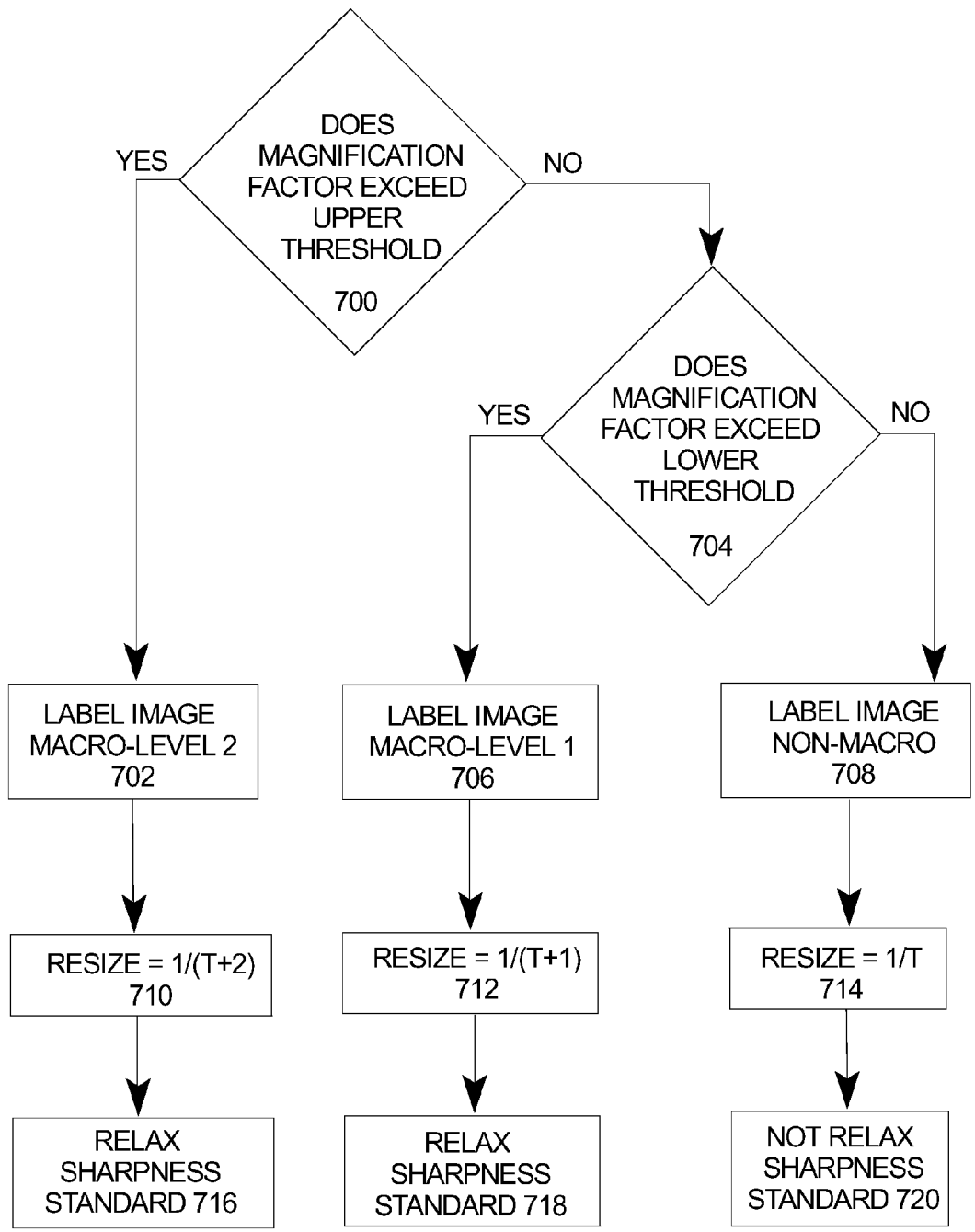
FIG. 7 is a flow chart that illustrates a variation to the image classification system.

Referring to FIG. 7, in certain embodiments, the classification system also includes a means for evaluating whether the image is a macro/close up type image and subsequently preprocessing the image and/or computing the image sharpness features based on whether the image is a macro/close up type image or a non-macro type image. For example, in one embodiment, initially at step 700, the magnification factor for the image is calculated and compared to an upper magnification factor threshold (e.g., 0.075, 0.09, 0.1, 0.11, 0.125, or another suitable value). If the magnification factor for the image meets or exceeds the upper magnification factor threshold, then at step 702 the image is labeled as a macro-level two type image. Conversely, if the magnification factor for the image does not meet or exceed the upper magnification factor threshold, then at step 704 the magnification factor for the image is compared to a lower magnification factor threshold (e.g., 0.01, 0.02, 0.03, 0.04, 0.05, or another suitable value). If the magnification factor for the image meets or exceeds the lower magnification factor threshold, then at step 706 the image is labeled as a macro-level one type image. Conversely, if the magnification factor for the image doe not meet or exceed the lower magnification factor threshold, then at step 708 the image is labeled as a non-macro image. Further, when metadata information is unavailable to calculate the magnification factor, the image is classified as a non-macro type image by default.

Additionally, in some embodiments, the image can be resized by a different resizing factor (see FIG. 4, step 402, step (iii) above) based on whether the image is labeled as a macro-level two type image, a macro-level one type image, or a non-macro image. In particular, in FIG. 7, at step 710, the macro-level two type image is resized utilizing a resizing factor of 1/(T+2), where T is a preselected integer, such as 1, 2 or 3. For example, the macro-level two type image can be resized utilizing a resizing factor of one-fifth. Additionally, at step 712, the macro-level one type image is resized utilizing a resizing factor of 1/(T+1), e.g., one-fourth. Further, at step 714, the non-macro type image can be resized utilizing a resizing factor of 1/T, e.g., one-third. Moreover, in one embodiment, the labeling of the image as a macro-level two type image, a macro-level one type image, or a non-macro type image for purposes of adjusting the resizing factor is only applicable to test images. Additionally and/or alternatively, the labeling of the image as a macro-level two type image, a macro-level one type image, or a non-macro type image for purposes of adjusting the resizing factor can also be applicable to training images.

Further, at step 716, for macro-level two type images, the sharpness standard can be relaxed. Stated another way, for macro-level two type images, the threshold for distinguishing whether an image is sharp or blurred can be adjusted to a more appropriate level. Additionally, at step 718, for macro-level one type images, the sharpness standard can be relaxed, albeit to a lesser degree, so that the threshold for distinguishing whether an image is sharp or blurred can again be adjusted to a more appropriate level. Conversely, at step 720, for non-macro type images, the sharpness standard is not relaxed and the computation of the image sharpness features is not adjusted.

As utilized herein, the purpose of introducing two levels of macro/close up modes is to improve sharp detection rate for difficult macro type images.

Still further, as provided above, in one embodiment, the original training image is resized, e.g., downsized, more than the original test image. For example, in one such embodiment where both the test images and the training images are adjusted based upon the macro-level two, macro-level one or non-macro image categorization, (i) if the images are classified as macro-level two images, then the test image can be resized by a resizing factor of one-fourth and the training image can be resized by a resizing factor of one-fifth; (ii) if the images are classified as macro-level one images, then the test image can be resized by a resizing factor of one-third and the training image can be resized by a resizing factor of one-fourth; and (iii) if the images are classified as non-macro images, then the test image can be resized by a resizing factor of one-half and the training image can be resized by a resizing factor of one-third.

Moreover, the categorization of images as macro/close up type images, e.g., macro-level one images or macro-level two images, or non-macro images can be utilized to adjust the computation of one or more of the image sharpness features. The perceived sharpness standard for macro/close-up type images seems slightly relaxed compared with other image types. It is possible that perceptual sharpness may be associated with scene content: people tend to be more strict with the sharpness of landscape type images, but less strict to macro/close-up natural scenes. Furthermore, it is also possible that perceptual sharpness may be associated with the depth of field (DOF) present inside the image. Low DOF image most likely contain heavily out-of-focus blur regions, therefore by contrast, people may perceive the image as sharp though it may contain some slightly blurred foreground.

In addition to potentially adjusting the resizing factor for macro/close up type images, it should be noted that there are other ways to adjust the algorithms to accommodate the slightly relaxed sharpness standard for macro/close-up type images. One way would be to relax the sharpness threshold towards blurry side in the trained sharpness classifier (e.g. LDA) for macro/close-up type images without adjustment in the sharpness feature computation.

For macro/close-up images with extremely low depth of field (DOF), additional adjustments can be made in the sharpness feature computation. The texture regions in the high pass image include not only sharp textures but also some slightly blurry textures. This is typically not a problem due to the presence of sufficient portions of sharp textures. However, for a sharp image with extremely low DOF, sharp texture portions can be extremely small compared with the slightly blurry textures. This can cause the second sharpness feature $F_2$ (mean value of textures in the high pass image) or the second oriented sharpness feature $OF_2$ (mean value of textures in the oriented high pass image) to be biased by the presence of the slightly blurry textures. In order to accurately reflect the sharp characteristics in images with extremely low DOF, the weak texture structures can be removed in the high pass image (or the oriented high pass image). The remaining texture regions are mainly affiliated with sharp textures in image after the proposed adjustment.

High Noise Level Images and Noise Reduction

As is known, a very small amount of noise may increase sharpness slightly in a test image, however, a large amount of noise deteriorates the sharpness of the test image. Stated in another fashion, sharpness is perceived differently between an image with normal to low noise level and an image with high noise level. Thus, the following adjustments can be made to accommodate the special sharpness characteristics of high noise level image.

Figure 8:
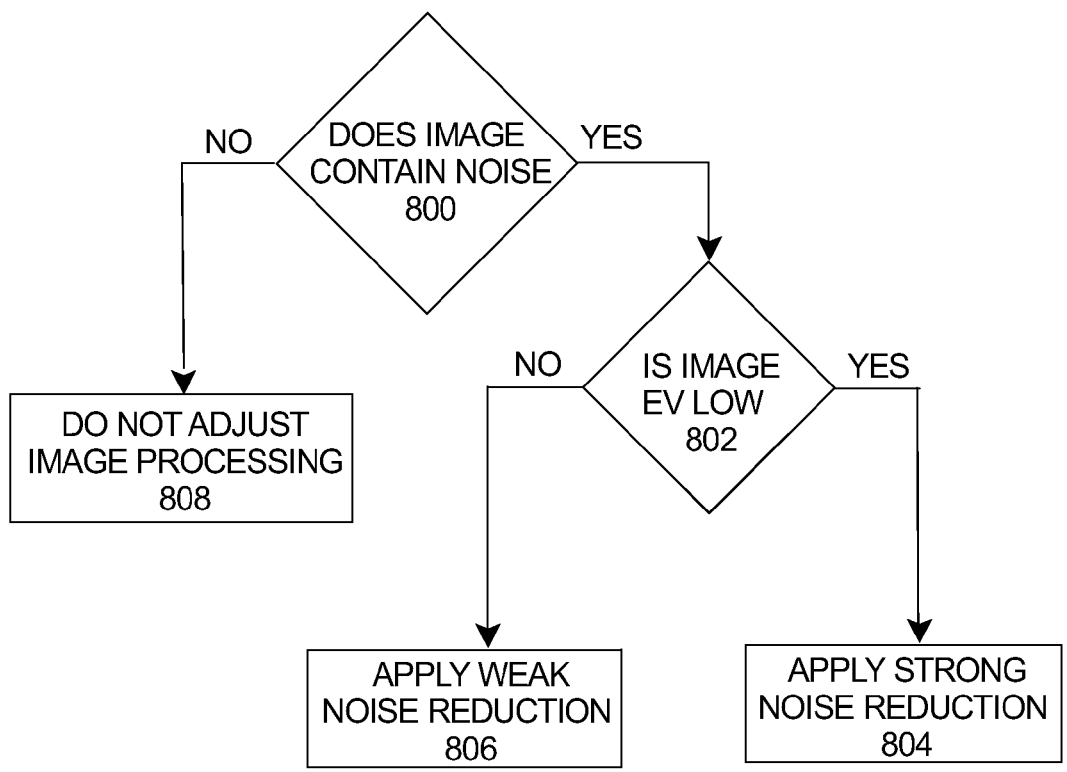
FIG. 8 is a flow chart that illustrates an additional variation to the image classification system.

Referring to FIG. 8, in certain embodiments, the classification system also includes, (i) at step 800, evaluating the test image to determine if it likely contains noise; (ii) if the image does likely contain noise, then at step 802, determining if the exposure value (EV) is low, i.e. if the lighting is bad (e.g., if the EV is below a certain EV_threshold of 5, 5.5, 6, 6.5, 7, 7.5, or another suitable EV); (iii) at step 804, if the EV is low, then applying strong noise reduction during generation of the high pass image or the oriented high pass image (see step 404 above); (iv) at step 806, if the EV is not low, then applying relaxed or weak noise reduction during generation of the high pass image or the oriented high pass image; and (v) if the image does not likely contain noise, then at step 808, processing the image without any adjustments/reductions for noise. In certain alternative embodiments, the classification system can include this variation without the inclusion of step 802, and strong noise reduction may be applied regardless of the exposure value.

In one embodiment, at step 800, metadata information can be used to identify an image with high noise level. More specifically, the ISO level of the test image can be compared with a certain ISO_threshold (e.g., an ISO level of 700, 800, 900, or another suitable value) to estimate if the image has high noise or not.

The ISO level is a measure of how sensitive the image sensor is to the amount of light present, where a higher number indicates higher sensitivity. Thus, the higher the ISO level, the more sensitive the image sensor is, and therefore the greater the ability to take pictures in low-light situations. However, in trying to boost the sensitivity of the image sensor by selecting a higher ISO level in order to record a fainter light signal, fainter, and thus more, noise is also likely to be recorded. In alternative embodiments, when ISO metadata information is not available, the test image can be processed as if the test image does not have noise.

At step 802, metadata information, i.e. the EV, is compared with the EV_threshold to estimate if the image has bad lighting or not. In particular, if the EV of the image is below the EV_threshold, then the image is considered to have low lighting. Subsequently, in alternative steps 804 or 806, a different measure of noise reduction can be applied to the image based on whether or not the noisy image also has low lighting. Thus, the degree of noise reduction that is employed to the image may be adjusted based on the ISO and the EV of the image. By way of example, strong noise reduction, as described below, can be applied in situations where the ISO is greater than or equal to 800 and the lighting is low (i.e. EV is below the EV_threshold). In such situations, one can be fairly confident that noise will exist, so there is a lower standard for pixels to be qualified as noise, and weak textures are likely to be treated as noise. Conversely, relaxed or weak noise reduction can be applied in situations where the ISO is greater than or equal to the ISO_threshold, but where the lighting is not bad, i.e. where the EV of the image is not below the EV_threshold. In such situations, one would be somewhat uncertain as to whether or not noise will exist in the image. Accordingly, a lower level of noise reduction is applied to the image. In such application, there is an increased standard for pixels to be qualified as noise, and weak textures are less likely to be treated as noise. In essence, this new method essentially creates a larger neighborhood within which to find noise, but since the likelihood of the existence of noise is less certain, a lesser degree of noise reduction is applied.

For a high noise image with a low exposure value, when strong noise reduction is appropriate, a simple noise reduction method can be used to remove pixels related to noise in the extracted texture regions of the high pass image (or the oriented high pass image) prior to calculation of the set of sharpness features of the image (see step 412 above).

$$T_1 = D_1 >= \text{texture} TH_1 \,\&\, \text{gradient} G >= \text{gradient} TH$$

$$T_1 = T_1 \,\&\, \text{noise\_reduction}(T_1)$$

Or $$OT_1 = OD_1 >= \text{texture} TH_1 \,\&\, \text{gradient} G >= \text{gradient} TH$$

$$OT_1 = OT_1 \,\&\, \text{noise\_reduction}(OT_1)$$

In one embodiment, the noise reduction is performed using a simple noise reduction filter (such as a 3×3 median filter, or linear ordered filter).

After the noise reduction process, texture regions in high pass image (or the oriented high pass image) contain mostly real sharp structures inside image rather than noises. Therefore features such as $F_2$, $OF_2$ can correctly reflect the sharpness characteristics of the image instead of suffering degradation due to heavy noises. Thus, in certain embodiments, the noise reduction is only applied to the high pass image (and not the band pass image) because image noise mainly influences the high pass image, while the band-pass image is robust to image noise.

Night/Indoor Scenes with Very Low Exposure Values

Figure 9:
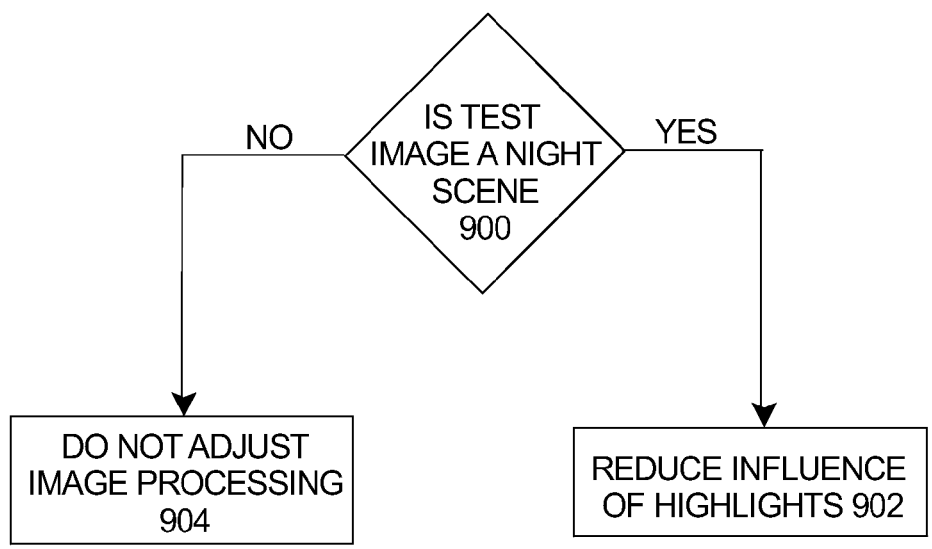
FIG. 9 is a flow chart that illustrates another variation to the image classification system.

Many night/indoor scenes contain highlights caused by direct/indirect light sources. The presence of highlights in blurry night/indoor scenes poses a great challenge for blur identification, as they often appear like sharp edges or textures. Referring to FIG. 9, in certain embodiments, the classification system also includes, (i) at step 900, evaluating the test image to determine if it is likely a night/indoor scene; (ii) if the image is likely a night/indoor scene, then at step 902, reducing the influence of these highlights and their vicinities in sharpness feature computation to improve the classification performance of blurry night/indoor scenes; and (iii) if the image is not likely a night/indoor scene, then at step 904, processing the image without any adjustments/reductions for night/indoor scene images. Step 902 can be done by carefully selecting and masking out highlights-related regions while avoiding over-masking crucial sharp structures in sharp night/indoor scenes.

In one embodiment, for night/indoor scenes, the highlights-related regions are identified by checking high gradients and expanding them in small neighborhoods. For example, the high gradient threshold can be selected as a preset lower boundary $grad\_th_1$ (e.g., 80 or other suitable value). An additional constraint can be added to require it not to exceed a certain upper boundary $grad\_th_2$, which is decided as the top n-per (e.g., 10%, 15%) gradient value among all non-smooth pixels. A non-smooth pixel is defined as one that has a gradient value higher than a certain threshold. The purpose of introducing the upper threshold $grad\_th_2$ is to reduce the risk of over-masking problem. Alternatively, the gradient information can be combined with color information to further improve the highlights masking process.

Once highlights-related regions are identified, these highlights-related regions are excluded from the texture regions of the high pass image and the band pass image prior to calculation of the set of sharpness features of the image (see step 412 above). Similarly, when possible motion blur is detected, the highlights-related regions are excluded in texture regions of the oriented high-pass and band pass images prior to calculation of the set of sharpness features of the image.

When metadata information is available, the night/indoor scenes can be detected using the exposure value (EV) information. For example, a considerably low EV_threshold (e.g., 6 or other suitable value) can be selected to identify night/indoor scenes to avoid falsely identify other non-night/indoor scenes. Additionally, images captured with a flash can be excluded as being considered a night scene and thus the test image can be processed as if the test image is not a night scene. Further, when metadata information is not available, the test image can be processed as if the test image is not a night scene.

Weak Textures for Non-Low EV Images

Figure 10:
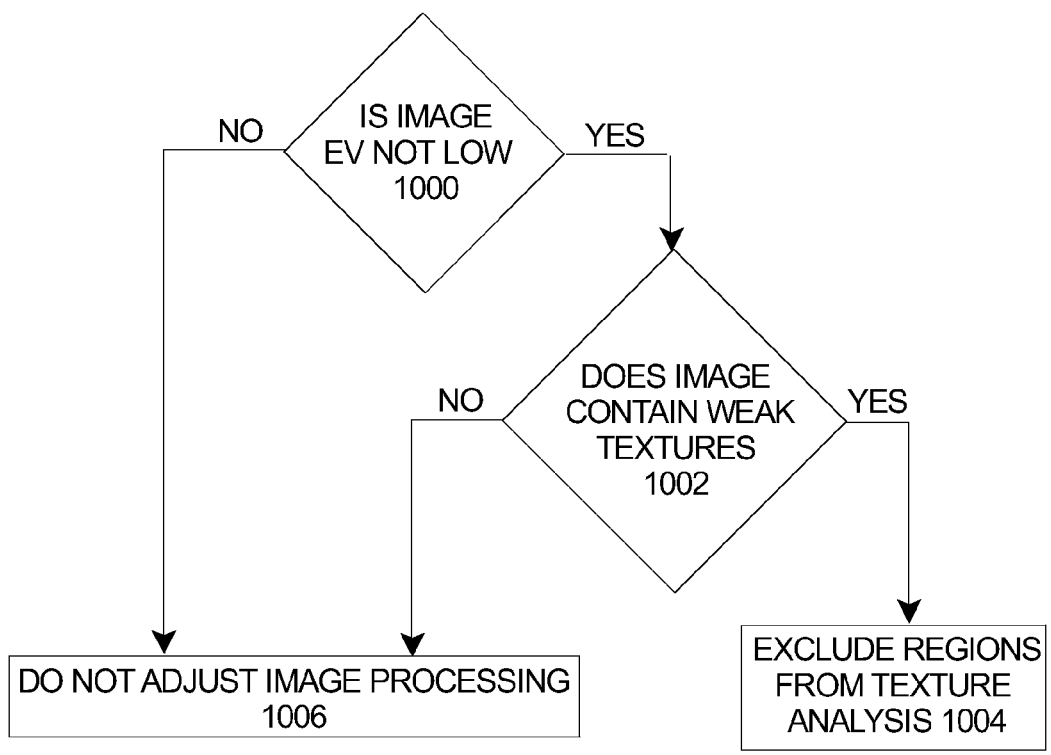
FIG. 10 is a flow chart that illustrates yet another variation to the image classification system.

In addition to removing noisy, low light images from the texture mask, as provided above, in certain embodiments, the present invention excludes weak textures from the texture mask even in situations that do not include low light (low EV). Referring to FIG. 10, in certain embodiments, the classification system also includes, (i) at step 1000, determining if the image includes a non-low EV, i.e. if the lighting is not low (e.g., if the EV exceeds a certain EV_threshold, such as provided above); (ii) if the lighting for the image, i.e. the EV, is not low, then at step 1002, evaluating the image to determine if it contains weak textures; (iii) if the does contain weak textures, then at step 1004, excluding these weak texture regions/pixels from the texture analysis; and (iv) if the image lighting is low, i.e. the EV is low, and/or if the image does not contain weak textures, then at step 1006, processing the image without any adjustments for weak textures and non-low EV images.

In one embodiment, at step 1000, metadata information, i.e. the EV, is compared with a certain EV_threshold and if the EV exceeds the EV_threshold then the image is considered to not have low lighting.

At step 1002, the image is evaluated to determine if the image contains weak textures so as to warrant disparate treatment under this variation. More specifically, in one embodiment, a pixel neighborhood of 5×1 (either vertical or horizontal) can be examined, and if the pixel intensity between the starting pixel and the ending pixel of the pixel neighborhood is small, i.e. if the intensity difference between the starting pixel and the ending pixel is below a certain specified intensity difference threshold, then the pixel neighborhood is considered as being indicative of a weak texture and/or a weak structure.

Subsequently, at step 1004, if the image has been captured in lighting that is not considered to be low in comparison to the EV_threshold, and if the image is found to contain weak textures, then such weak texture pixels and/or regions that would otherwise be analyzed as texture regions for purposes of calculating image sharpness features are excluded from such analysis. By excluding such weak pixels/regions from texture analysis in non-low lighting situations, the sharp detection rate of the image classification system can be improved.

High Contrast Blurry Structures

Figure 11:
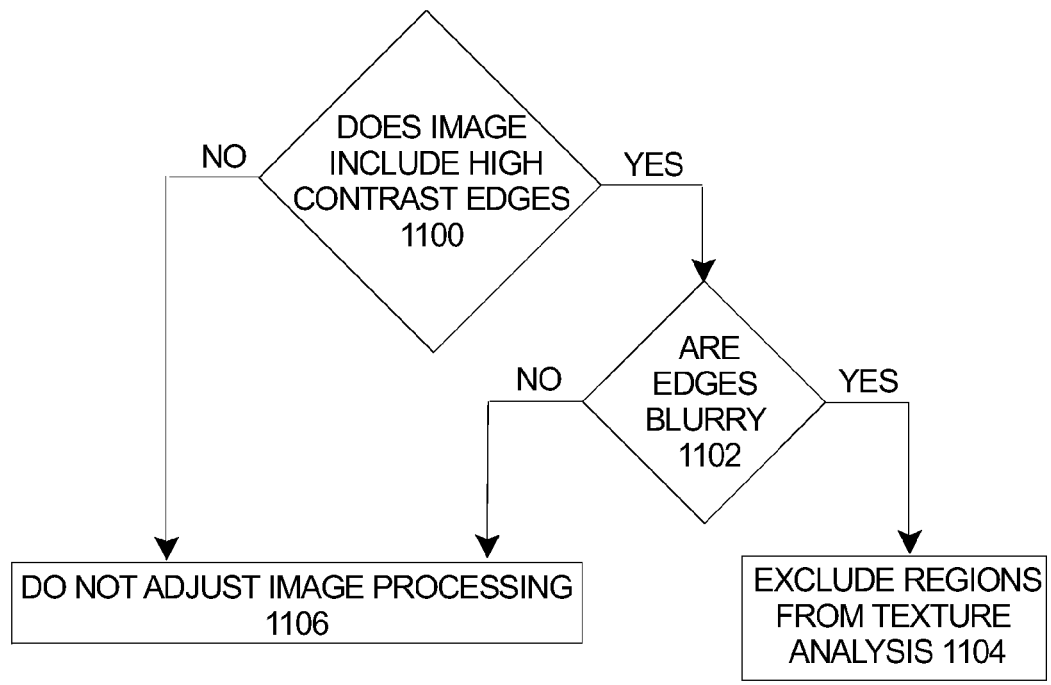
FIG. 11 is a flow chart that illustrates still another variation to the image classification system.

Another enhancement included in the present invention includes identifying high contrast blurry structures (or edges) and excluding them from the texture mask. Referring to FIG. 11, in certain embodiments, the classification system also includes, (i) at step 1100, evaluating the image to determine if it contains high contrast edges; (ii) if the image does contain high contrast edges, then at step 1102, determining if the high contrast edges are blurry; (iii) if the high contrast edges are blurry, then at step 1104, excluding these regions/pixels from the texture analysis; and (iv) if the image does not contain high contrast edges and/or if the high contrast edges are not blurry, then at step 1106, processing the image without any adjustments for high contrast blurry structures.

In practice, at step 1100, a high contrast edge is identified as including an intensity value change between neighboring pixels that exceeds a certain intensity change threshold. For example, in one embodiment, the intensity value change threshold for the initial jump to classify an edge is whether the intensity change is greater than or equal to 96. Alternatively, the intensity value change threshold can be set higher or lower than 96 depending on the specific requirements of the image classification system.

Subsequently, at step 1102, the high contrast edge is evaluated to determine if the high contrast edge can be accurately categorized as sharp or blurry. In instances where the intensity change is quick and then completed (the intensity values then become basically the same between neighboring pixels) within a small number of pixels (e.g., within five pixels in the preprocessed/reduced image), then the high contrast edge can be categorized as sharp. However, where there is a quick change in pixel intensity value between neighboring pixels, but then the intensity value continues to change over a number of neighboring pixels, albeit at a potentially lower rate, then that is emblematic of a high contrast blurry edge.

In categorizing between sharp and blurry for such high contrast edges, a qualifying intensity value change threshold is applied as well as a neighborhood size threshold. For example, in one embodiment, a suitable qualifying intensity value change threshold of 16 can be utilized for distinguishing between sharp and blurred, as well as a neighborhood size of seven pixels, i.e. a 7×1 pixel window or neighborhood. Stated another way, in such embodiment, if any continuing intensity value change of greater than or equal to 16 occurs between neighboring pixels within the 7×1 window, then the high contrast edge is categorized as blurry. If the end pixels show an intensity change of greater than or equal to 16, then the intensity change is still growing and thus the edge is categorized as blurry and thus is excluded from the texture analysis.

More particularly, in such embodiment, this variation of the image classification system includes the steps of (i) coarsely approximating the gradient direction (the direction of large intensity change exceeding the intensity value change threshold) as either horizontal or vertical; (ii) identifying pixels along that gradient direction with high contrast in terms of intensity change within a 7×1 window and/or with gradient values above a certain threshold in either end of a 7×1 window. As noted above, high contrast sharp edges are usually completed in terms of intensity change within five pixels, and thus, the 7×1 window establishes a conservative threshold within which to identify whether the high contrast edge should be classified as sharp and thus included in the texture analysis, or blurry and thus excluded from the texture analysis.

By excluding such high contrast blurry edges from texture analysis, the small blur detection rate of the image classification system can be improved, as such high contrast blurry edges could be easily misclassified as sharp because the large intensity jump makes it look like a sharp edge.

Rich Texture Images

Figure 12:
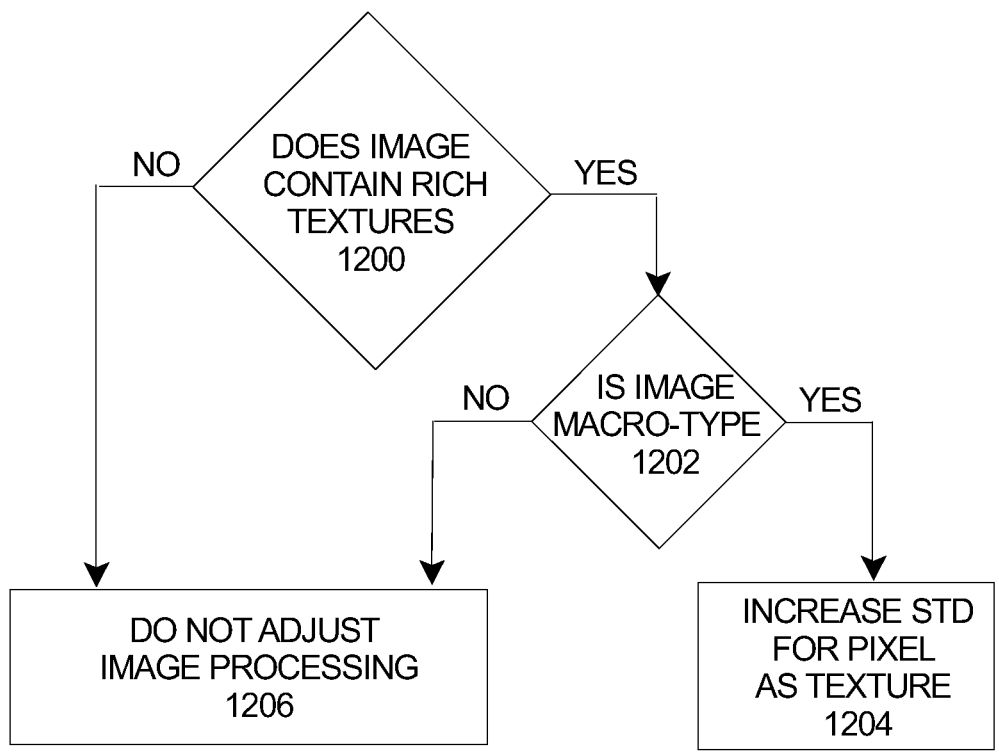
FIG. 12 is a flow chart that illustrates still yet another variation to the image classification system.

Yet another enhancement of the present invention involves the application of a slightly modified handling for images with rich textures. Images with rich textures can be defined as an image having a certain percentage of the pixels as being texture pixels. Referring to FIG. 12, in certain embodiments, the classification system also includes, (i) at step 1200, evaluating the image to determine if it contains rich textures; (ii) if the image does contain rich textures, then at step 1202, determining if the image is a macro-type image; (iii) if the image is a macro-type image, then at step 1204, increasing the standard for a pixel to be qualified as texture; and (iv) if the image does not contain rich textures and/or if the image is not a macro-type image, then at step 1206, processing the image without any adjustments for rich texture, macro-type images.

As note above, an image can be categorized as including rich textures if the image includes a certain threshold percentage of texture pixels as compared to the total number of pixels. Accordingly, at step 1200, the full image can be analyzed to determine if a number or percentage of pixels in the image can be categorized as texture pixels so as to meet or exceed the threshold for categorizing the image as including rich textures.

Subsequently, at step 1202, the image is evaluated in a manner substantially similar to that described above in relation to FIG. 7 in order to determine if the image can be categorized as a macro-type image, e.g., as a macro-level one image or a macro-level two image. In particular, the magnification factor of the image is compared to one or more magnification factor thresholds to determine if the image can be categorized as a macro-type image.

At step 1204, if the image is found to contain rich texture and the image is also a macro-type image, then an increased standard is employed in order for the pixel (and thus that portion of the image) to be qualified as texture. Stated another way, if the image is found to contain rich texture and is also a macro-type image, then the step of identifying texture regions in the image (see e.g., step 408 or step 410 in FIG. 4) includes increasing one or more of the preset texture threshold and the preset gradient threshold for identifying texture regions in the image. In essence, this excludes certain portions of the image to be used in texture analysis, i.e. for calculation of image sharpness features. If a given image is found to include rich texture, but the image is a non-macro image, then all of the texture information is used for purposes of texture analysis. Conversely, if a given image is found to include rich texture and is a macro-level image, then the increased standard is applied for qualifying any given pixel as texture. Thus, in such situations, a lower percentage of pixels are ultimately used for purposes of texture analysis. By utilizing this feature variation, small blur detection for images with rich textures can be improved.

As provided herein, a total of six sharpness features, $F_1$ to $F_6$ or $OF_1$ to $OF_6$ are used to capture the sharpness characteristics of an image. Among these six sharpness features, the first sharpness feature $F_1$ (or $OF_1$) is implicitly used in the training/testing process, and the remaining five other sharpness features are explicitly used for training/testing sharpness classifier. The first sharpness feature $F_1$ or $OF_1$ measures the percentage of textures present in image. When the texture percentage is extremely low, information associated with texture regions is highly unreliable. Therefore, in the training process, images with extremely low texture percentage can be excluded to avoid causing instability of the classifier. Similarly, in testing process, a test image is classified as blurry if it contains extremely low level of texture percentage. In alternative non-exclusive embodiments, the test image has an extremely low texture percentage and is classified as blurry if is has a texture percentage of less than approximately 0.1, 0.05, 0.0025, or 0.001 percent.

Additionally, some interesting trends exist in the individual sharpness features such as $F_2$, $F_4$ or ($OF_2$, $OF_4$). From one side, these sharpness features show very high values with certain crispy sharp images such as text images, high contrast landscape images, etc. From the other side, these features reveal much lower values for blur images. As provided herein, experimentation reveals that there is a strong separation of sharp vs. blur based on these individual features. Therefore certain sharpness features can be checked first to identify certain crispy sharp images, before supplying the remaining five sharpness features to the sharpness classifier to predict sharp or blur.

In one non-exclusive embodiment, the test image is classified as sharp if the mean energy in the textured regions of the test high pass image ($F_2$ or $OF_2$) is greater than a second feature predetermined level. In one example, if the second test sharpness feature has been normalized to a [0 1] range, the second feature predetermined level can be 0.9. In this example, if the second test sharpness feature of the test image has a normalized value that is greater than 0.9, it is classified as sharp without doing any additional analysis. This typically only occurs in text-type images or high contrast landscape images. Alternatively, for example, the second feature predetermined level can be 0.95, or 0.97.

Alternatively or additionally, the test image can be classified as sharp if the ratio of mean energy difference between textures in the test band pass image to the mean energy of textures in the test high pass image ($F_4$ or $OF_4$) is greater than a fourth feature predetermined level. In one example, if the fourth test sharpness feature has been normalized to a [0 1] range, the fourth feature predetermined level can be 0.85. In this example, if the fourth test sharpness feature of the test image has a normalized value that is greater than 0.85, it is classified as sharp without doing any additional analysis. This typically only occurs in text-type images or high contrast landscape images. Alternatively, for example, the fourth feature predetermined level can be 0.9 or 0.95.

It should be also noted that multiple sharpness classifiers can be generated to fit different application needs. For example, a special classifier can be trained to distinguish sharp or blur for images captured from DSLR type cameras, or for images captured from compact type cameras. Furthermore, a more sophisticated classification algorithm can be used instead of the LDA sharpness classification algorithm for further potential improvement.

In another embodiment, the model can provide various ranges of values that can predict, to a desired confidence level, the extent of the blur in a test image. For example, if the test image value falls within a particular range of values, the test image can be categorized as "slightly blurred", rather than "blurred". This may be helpful to the user since a slightly blurred image may be worthy of further image manipulation to correct the blur, while a blurred image may not be correctible, and can be deleted to free up memory space and/or avoid printing time and resources.

While a number of exemplary aspects and embodiments of an image classification system 300 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for determining if a test image is either sharp or blurred, the method comprising the steps of:
   training a sharpness classifier to discriminate between sharp and blurred images, the sharpness classifier being trained based on a set of training sharpness features computed from a plurality of training images, the set of training sharpness features for each training image being computed by (i) resizing each training image by a first resizing factor; (ii) identifying texture regions in the resized training image; and (iii) computing the set of sharpness features in the training image from the identified texture regions; and
   applying the trained sharpness classifier to the test image to determine if the test image is sharp or blurred based on a set of test sharpness features computed from the test image, the set of test sharpness features for each test image being computed by (i) resizing the test image by a second resizing factor that is different than the first resizing factor; (ii) identifying texture regions in the resized test image; and (iii) computing the set of sharpness features in the test image from the identified texture regions.

2. The method of claim 1 wherein the first resizing factor is smaller than the second resizing factor.

3. The method of claim 1 wherein the step of training includes the steps of generating a high pass training image from the resized training image, and identifying texture regions in the high pass training image by constraining texture regions in the high pass training image to be pixels with values in the high pass training image that exceed a preset texture threshold and constraining texture regions in the high pass training image to be pixels with corresponding gradient values exceed a preset gradient threshold; and wherein the step of applying includes the steps of generating a high pass test image from the resized test image, and identifying texture regions in the high pass test image by constraining texture regions in the high pass test image to be pixels with values in the high pass test image that exceed a preset texture threshold and constraining texture regions in the high pass test image to be pixels with corresponding gradient values exceed a preset gradient threshold.

4. The method of claim 3 wherein the step of training includes the steps of generating a band pass training image from the resized training image, and identifying texture regions in the band pass training image by constraining texture regions in the band pass training image to be pixels with values in the band pass training image that exceed a preset texture threshold and constraining texture regions in the band pass training image to be pixels with corresponding gradient values exceed a preset gradient threshold; and wherein the step of applying includes the steps of generating a band pass test image from the resized test image, and identifying texture regions in the band pass test image by constraining texture regions in the band pass test image to be pixels with values in the band pass test image that exceed a preset texture threshold and constraining texture regions in the band pass test image to be pixels with corresponding gradient values exceed a preset gradient threshold.

5. The method of claim 4 further comprising the step of determining if there is motion blur in the test image, and wherein if it is determined that there is motion blur in the test image, the step of generating the high pass test image and the step of generating the band pass test image includes the use of one or more oriented filters or if it is determined that there is not motion blur in the test image, the step of generating the high pass test image and the step of generating the band pass test image includes the use of one or more omni-directional filters.

6. The method of claim 4 wherein the step of computing the set of sharpness features in the training image and/or computing the set of sharpness features in the test image includes computing one or more of the following sharpness features:
   (i) a measure of the texture percentage in the band pass image;
   (ii) a measure of the mean energy in the textured regions of the high pass image;
   (iii) a measure of the mean energy in the textured regions of the band pass image;
   (iv) a measure of the ratio of mean energy difference between textures in the band pass image to the mean energy of textures in the high pass image; and
   (v) a measure of the mean ratio of per texture pixel energy in the band pass image to the combined energy of the band pass image and the high pass image.

7. The method of claim 1 further comprising the step of (i) calculating a hand-holdable factor for the test image; (ii) comparing the hand-holdable factor to a hand-holdable factor threshold; and (iii) if the hand-holdable factor exceeds the hand-holdable factor threshold, then testing the test image for motion blur.

8. The method of claim 1 further comprising the steps of: identifying metadata associated with the test image; and using the metadata associated with the test image to aid in determining if the test image is sharp or blurred, wherein the metadata includes one or more of the following: ISO value associated with the test image; an exposure value associated with the test image; magnification factor associated with the test image; and a depth of field factor associated with the test image.

9. The method of claim 8 further comprising the steps of categorizing the test image as a macro type image or a non-macro type image based on the magnification factor; and resizing the test image by a different resizing factor depending on whether the test image is categorized as a macro type image or a non-macro type image.

10. The method of claim 8 further comprising the steps of categorizing the test image as a macro-level one type image, a macro-level two type image or a non-macro type image based on the magnification factor; and resizing the test image by a different resizing factor depending on whether the test image is categorized as a macro-level one type image, a macro-level two type image or a non-macro type image.

11. The method of claim 8 further comprising the steps of: identifying a test image with high noise level based on the ISO value; determining if the exposure value of the test image is low; applying strong noise reduction to pixels in the texture regions of the test image if the test image has high noise level and the exposure value is low; and applying relaxed noise reduction to pixels in the texture regions of the test image if the test image has high noise level and the exposure value is not low.

12. The method of claim 8 further comprising the steps of: determining if the exposure value of a test image is not low; evaluating the test image to determine if the test image contains weak texture regions; and excluding pixels in the weak texture regions from the step of computing the set of sharpness features in the test image from the identified texture regions if the test image has the exposure value that is not low.

13. The method of claim 8 further comprising the steps of: identifying a high contrast edge in the test image; approximating the gradient direction of the high contrast edge; determining if the high contrast edge is blurry; and excluding pixels in the texture regions of the test image from the step of computing the set of sharpness features in the test image from the identified texture regions if they define blurry high contrast edges.

14. The method of claim 8 wherein the step of identifying texture regions in the resized test image includes the steps of constraining texture regions in the resized test image to be pixels with values in the resized test image that exceed a preset texture threshold and constraining texture regions in the resized test image to be pixels with corresponding gradient values that exceed a preset gradient threshold; and further comprising the steps of: determining if the resized test image includes rich texture; categorizing the resized test image as a macro type image or a non-macro type image based on the magnification factor; and increasing one or more of the preset texture threshold and the preset gradient threshold for identifying texture regions in the resized test image if the test image includes rich texture and is a macro-type image.

15. A camera including a capturing system for capturing a test image, and a control system that utilizes the method of claim 1 to estimate if the test image is either sharp or blurred.

* * * * *